United States Patent [19]

Kanayama

[11] Patent Number: 5,193,416
[45] Date of Patent: Mar. 16, 1993

[54] MECHANICAL-HYDRAULIC TRANSMISSION GEAR SYSTEM AND METHOD OF CONTROLLING POWER TRANSMISSION USING THE SYSTEM

[75] Inventor: Noboru Kanayama, Hiratsuka, Japan
[73] Assignee: Kabushiki Kaisha Komatsu Seisakusho, Tokyo, Japan
[21] Appl. No.: 613,706
[22] PCT Filed: May 31, 1989
[86] PCT No.: PCT/JP89/00547
 § 371 Date: Nov. 29, 1990
 § 102(e) Date: Nov. 29, 1990
[87] PCT Pub. No.: WO89/12188
 PCT Pub. Date: Dec. 14, 1989

[30] Foreign Application Priority Data

Jul. 28, 1988 [JP] Japan .................. 63-188626
Mar. 30, 1989 [JP] Japan .................. 1-079791
May 31, 1989 [JP] Japan .................. 63-133765

[51] Int. Cl.$^5$ ............... F16H 47/00; F16D 39/00
[52] U.S. Cl. ........................... 74/733.1; 74/730.1; 74/732.1; 74/880; 475/72; 475/78; 475/80; 60/490
[58] Field of Search ............ 74/730.1, 732.1, 733.1, 74/880; 475/72, 78, 80; 60/426, 427, 489, 490, 491, 492, 493

[56] References Cited

U.S. PATENT DOCUMENTS 3,212,358 10/1965 DeLalio .................... 74/880
3,733,931  5/1973 Nyman et al. ............. 74/880 X
(List continued on next page.)

FOREIGN PATENT DOCUMENTS 234136  9/1987 European Pat. Off. .
1078399 3/1960 Fed. Rep. of Germany .
2757191 7/1979 Fed. Rep. of Germany .
39-5356  4/1964 Japan .
57-38832  8/1982 Japan .

Primary Examiner—Leslie A. Braun
Assistant Examiner—David E. Henn

Attorney, Agent, or Firm—Armstrong, Westerman, Hattori, McLeland & Naughton

[57] ABSTRACT

A mechanical-hydraulic transmission gear system for use in construction vehicles or construction equipment and a method of controlling power transmission using the system arranged such that when a prime mover is rotating at high speeds, power transmission is effected only through a mechanical transmission gear to thereby reduce the power loss due to fluid pressure substantially to zero, while when the prime mover is rotating at low speeds power transmission is effected only through a hydraulic transmission gear so as to facilitate control of the speed of the vehicle and control of changing forward running over to reversing and vice versa. The mechanical-hydraulic transmission gear system comprises a hydraulic transmission gear (10) having a hydraulic pump (11) and a hydraulic motor (13); a mechanical transmission gear (30); change-over means (26) for changing forward running of the vehicle over to reversing and vice versa; a speed control means (27); a sensor means (22) for sensing the rotational speed of output shaft (14); and control means (20) for comparing the signals transmitted by the change-over means, the speed control means and the rotational speed sensor means so as to effect control of disconnection and connection of a clutch (31) mounted on an input shaft (2) of the mechanical transmission gear and control of discharge of fluid from the pump and the motor. The method of controlling power transmission using this system includes the steps of disconnecting the clutch of the mechanical transmission so as to transmit the power from the prime mover only through the hydraulic transmission gear to the output shaft when the rotational speed of the output shaft is lower than a predetermined value; and connecting the clutch of the mechanical transmission gear so as to transmit the power only through the mechanical transmission gear to the output shaft and minimizing the power required by the hydraulic transmission gear according to a command from the control means when the rotational speed of the output shaft is higher than the predetermined value.

22 Claims, 18 Drawing Sheets

U.S. PATENT DOCUMENTS

| | | | |
|---|---|---|---|
| 3,897,697 | 8/1975 | Chambers et al. | 475/80 |
| 4,185,521 | 1/1980 | Beals | 74/880 X |
| 4,232,570 | 11/1980 | Gibson | 74/880 X |
| 4,242,922 | 1/1981 | Baudoin | 74/880 |
| 4,246,806 | 1/1981 | Reynolds et al. | 74/880 |
| 4,254,672 | 3/1981 | Mizuno et al. | 74/880 X |
| 4,364,229 | 12/1982 | Shiber | 60/490 X |
| 4,368,653 | 1/1983 | Mizuno et al. | 74/880 X |
| 4,519,274 | 5/1985 | Maruyama et al. | 74/880 X |
| 4,691,802 | 9/1987 | Ishimori et al. | 60/490 X |
| 4,768,340 | 9/1988 | Hamilton | 60/489 X |
| 4,869,065 | 9/1989 | Hopkins | 60/493 X |
| 4,983,149 | 1/1991 | Kita | 475/76 |
| 5,018,351 | 5/1991 | Otte | 60/489 X |
| 5,024,633 | 6/1991 | Schmidt | 475/72 |
| 5,042,251 | 8/1991 | Berthold | 60/490 X |
| 5,088,041 | 2/1992 | Tanaka et al. | 74/866 X |

THE PRIOR ART

THE PRIOR ART

FIG. 10A

Degree of opening θt of throttle vs. Rotational speed "No" of output shaft (vehicle speed "V")

1st, 2nd
— SHIFT UP
--- SHIFT DOWN

FIG. 10B

Torque "To" on output shaft (tractive force "F" of vehicle) vs. Rotational speed "No" of output shaft (vehicle speed "V")

FIG. 11

| SPEED STAGE | Td | Tr | ir | Tf | Tt | Te | Tc | |
|---|---|---|---|---|---|---|---|---|
| N→1 | | | | | | | | |
| 1→2 | | | | | | | | |
| 2→1 | | | | | | | | |
| N→R | | | | | | | | |

FIG. 18

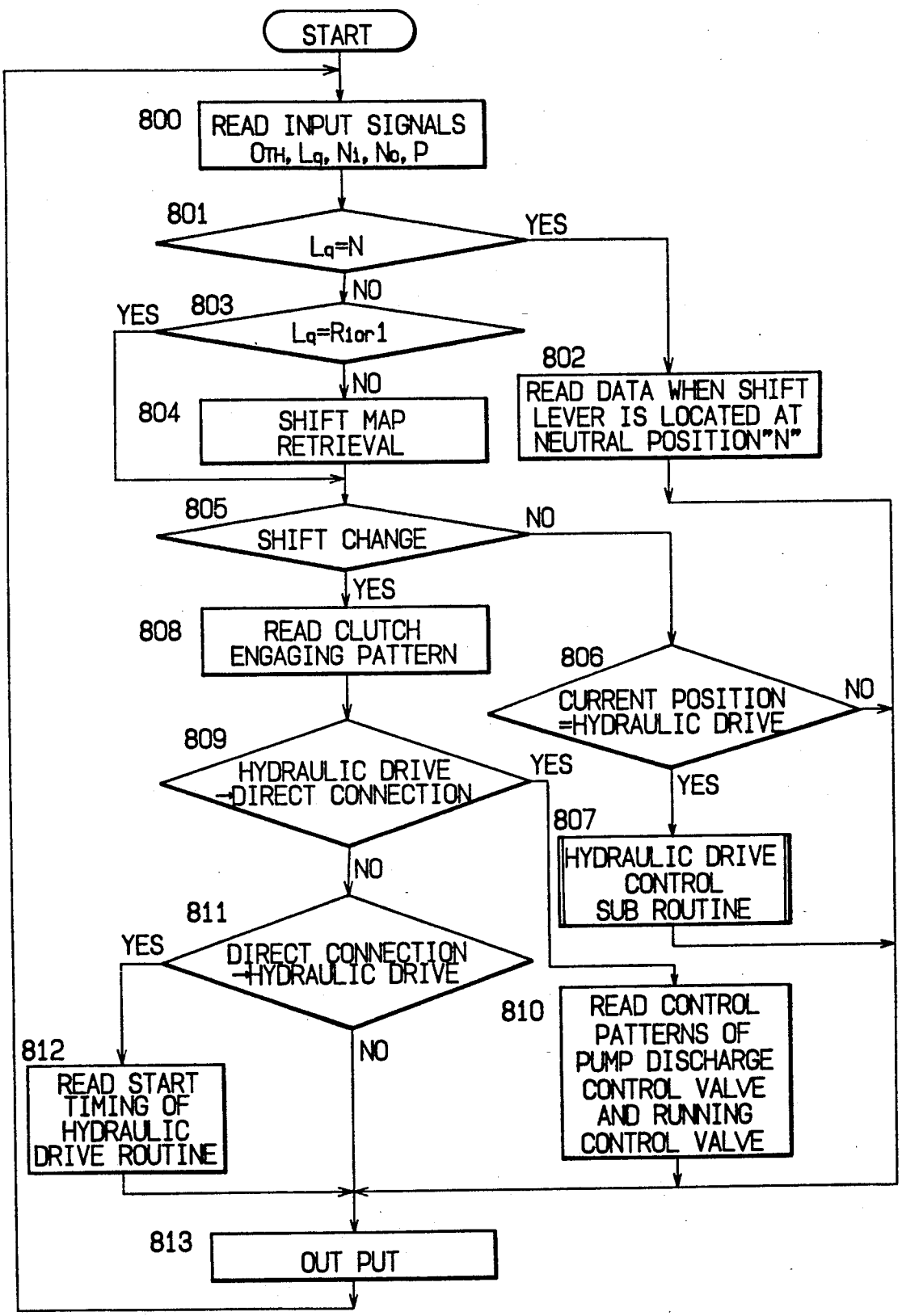

| SPEED STAGE TO BE CHANGED | Td | Tr | ir | Tf | Tt | Te | Tc | | |
|---|---|---|---|---|---|---|---|---|---|
| N→1 | | | | | | | | | |
| 1→2 | | | | | | | | | |
| 2→3 | | | | | | | | | |
| 3→4 | | | | | | | | | |
| 4→3 | | | | | | | | | |
| 3→2 | | | | | | | | | |
| 2→1 | | | | | | | | | |
| N→R1 | | | | | | | | | |
| R1→R2 | | | | | | | | | |
| R2→R1 | | | | | | | | | |

FIG. 24

|  | SPEED STAGES | | | | |
|---|---|---|---|---|---|
|  | 1st | 2nd | 3rd | 4th | 5th |
| EMBODIMENT 1 | H | M | — | — | — |
| EMBODIMENT 2 | H | H | M | M | — |
| APPLICATION 1 | H | M | M | M | — |
| APPLICATION 2 | H | H | H | M | — |
| APPLICATION 3 | H | M | M | M | M |
| APPLICATION 4 | H | H | M | M | M |

H : HYDRAULIC DRIVE
M : MECHANICAL DRIVE

MECHANICAL-HYDRAULIC TRANSMISSION GEAR SYSTEM AND METHOD OF CONTROLLING POWER TRANSMISSION USING THE SYSTEM

TECHNICAL FIELD OF THE INVENTION

This invention relates to a mechanical-hydraulic transmission gear system and a method of controlling power transmission using the gear system, more particularly this invention relates to a power transmission system for use in construction vehicles or construction equipment such as wheel type power shovels and rough terrain cranes, etc and a method of controlling power transmission using the gear system, wherein when the prime mover thereof is rotating at high speeds, the power loss due to fluid pressure is reduced substantially to zero so as to avoid a lowering in power transmission efficiency, and power transmission is effected only through the mechanical transmission gear so as to improve tractive force. When the prime mover is rotating at low speeds, speed control and control of change-over from forward rotation to reversing and vice versa can be made readily, and power transmission is effected only through the hydraulic transmission gear so as to improve the composite maneuverability of implement.

BACKGROUND ART OF THE INVENTION

As the power transmission gear of construction equipment, etc. the following systems have heretofore been used.
1. Mechanical power transmission system
2. Hydraulic power transmission system (HST)
3. Mechanical-hydraulic power transmission system (HMT)

In the mechanical-hydraulic power transmission system (HMT), part of the power is transmitted mechanically and the rest of the power is transmitted hydraulically; in other words, a power division type hydraulic transmission system (hydraulic-mechanical power transmission), among which an output division type as shown in FIG. 1 is well known.

However, in the above-mentioned prior art transmission gears, the mechanical power transmission system is excellent in power transmission efficiency, but poor in the control of change-over from forward running to reversing and vice versa. The hydraulic power transmission system (Refer to FIG. 2) is capable of effecting control of change-over from forward rotation to reversing and vice versa, by varying the tilting angle of swash plates of a variable displacement hydraulic pump 51 and a variable displacement hydraulic motor 52. The system and therefore can be operated easily, and is also capable of changing the rotational speed of the output shaft by engagement between gears 53 and 54, engagement between gears 55 and 56 and change-over between clutches 57 and 58. However, such a system is disadvantageous in that when the output shaft is rotating at high speeds the tilting angle of the swash plate of the pump 51 is increased to increase the discharge flow-rate of fluid thus increasing the pressure loss, while the tilting angle of the swash plate of the motor 52 is reduced thus causing a lowering in efficiency. For this reason, when the output shaft of the mechanical-hydraulic power transmission system (Refer to FIG. 1) is rotating at high speeds mechanical power transmission is effected so as to avoid lowering in efficiency. While when the output shaft is rotating at low speeds, hydraulic power transmission is effected so as to facilitate control of change-over from forward rotation to reversing and vice versa. This type of system has been used in various fields.

In FIG. 1, an input shaft 62 is connected to a prime mover 61, and an intermediate portion of the input shaft 62 has a gear 64 fixedly secured thereto and which meshes with a hydraulic pump driving gear 63. Further, a sun gear 65 of a planetary gear device A is fixedly secured to one end of the input shaft 62. The hydraulic pump driving gear 63 is arranged to drive a variable displacement type pump 66 of a hydraulic transmission gear B provided on one side of the input shaft of driving gear 63. This variable displacement type pump 66 is arranged to actuate a fixed displacement motor 67 mounted in juxtaposition thereto and parallel with the axis of the input shaft 62. This fixed displacement motor 67 has an output shaft provided with a gear 68 to which the power developed by the motor 67 is transmitted. The gear 68 is arranged to rotatively drive an internal gear 69-1 of the planetary gear device A through a gear 69 which meshes therewith. A planetary gear 70 is provided between the internal gear 69-1 and the sun gear 65. The planetary gear 70 has a shaft supporting frame 71 which is connected to an output shaft 72. The arrangement is made such that revolution of the planetary gear 70 around the sun gear 65; that is, rotational motion of the shaft supporting frame 71 can be transmitted to a starting wheel 73 mounted on the body of a construction vehicle. When the variable displacement type pump 66 is at its neutral position, the hydraulic transmission gear B conducts only braking action and the internal gear 69-1 is fixed. Therefore the planetary gear device A serves as a mechanical planetary reduction gear. Speed control of the output shaft 72 is effected by a speed control means, not shown, such as a governor or the like provided in the prime mover 61. Further, when the variable displacement type pump 66 is actuated, part of the power developed by the prime mover is transmitted in turn through transmission elements 64, 63, 66, 67, 68, 69 to the planetary gear 70, while the rest of the power is mechanically transmitted in turn through transmission elements 62, 65 to the planetary gear 70.

The above-mentioned prior art mechanical-hydraulic power transmission system has the following disadvantages. Since the fixed displacement motor 67 is arranged to drive the internal gear 69-1, in order to change the number of revolutions of the output shaft from forward rotation to reversing, it is essential to use a double-discharge, variable displacement pump 66 as the hydraulic pump and to rotate the internal gear 69-1 at a considerably high speed when the number of revolutions of the output shaft 72 has reached a predetermined value. Therefore, the ratio of displacement between the hydraulic motor and the hydraulic pump must be set at a very big value. In practice, selection of a hydraulic pump and a hydraulic motor which meet such conditions is extremely difficult. Further, such a prior art mechanical-hydraulic transmission gear system is disadvantageous in that, since the hydraulic pump, the hydraulic motor and the planetary gear device constituting the hydraulic transmission gear B are juxtaposed in the axial direction of the input shaft 62, the whole system becomes large in size. Further, in the case where the fluid circuit is changed over to supply the fluid under pressure discharged by the hydraulic pump to another hydraulic actuator such as an implement of the construction equipment, the power is always partially transmitted to the output shaft 72. Even if the output shaft 72 is fixedly secured by means of a brake or the like, the fixed displacement type motor 67 is rotated by the power transmitted from the planetary gear 70 through the internal gear 69-1 and the gear 68 thereto, thus causing rotational losses or power losses.

SUMMARY OF THE INVENTION

The present invention has been made in view of the above-mentioned circumstances in the prior art.

A first object of the present invention is to provide a mechanical-hydraulic transmission gear system, and a method of controlling power transmission using the system, wherein when the prime mover thereof is rotating at high speeds, only mechanical power transmission is effected. This reduces the power loss due to fluid pressure substantially to zero, avoids a lowering in power transmission efficiency, and improves the tractive force. When the prime mover is rotating at low speeds, only hydraulic power transmission is effected so as to facilitate speed control and control of changeover from forward rotation to reversing, and vice versa, and to improve the complex maneuverability of the implement.

Another object of the present invention is to provide a mechanical-hydraulic transmission gear system, and method, which enables efficient and smooth power transmission to be effected without using a planetary gear device, which has a simple and compact construction, and can be manufactured at a low cost as well.

A further object of the present invention is to provide a mechanical-hydraulic transmission gear system, and a method of controlling power transmission using the system, wherein when fluid under pressure discharged by a hydraulic pump is supplied to another hydraulic actuator by changing over the hydraulic circuit of the hydraulic transmission gear, the energy of fluid pressure can be utilized effectively without extra power loss.

A still further object of the present invention is to provide a mechanical-hydraulic transmission gear system, and a method of controlling power transmission using the system, wherein change-over operations between the hydraulic transmission gear and the mechanical transmission gear, as well as change-over operations in each of the hydraulic transmission gear and the mechanical transmission, can be conducted smoothly and rapidly. Such is accomplished detecting changes in the rotational speed of the output shaft of the prime mover thereof, the degree of opening of the throttle, and the shift position of speed change lever and controlling the fluid pressure to be supplied to each clutch by means of a control unit.

To achieve the above-mentioned objects, according to a first aspect of the present invention, there is provided a method of controlling power transmission using a mechanical-hydraulic power transmission gear system including a prime mover having a speed control means; a hydraulic transmission gear having a variable displacement hydraulic pump and a variable displacement hydraulic motor; a control unit; and a mechanical transmission gear. When the rotational speed of an output shaft is lower than a predetermined value, the method includes the steps of disconnecting a clutch of the mechanical transmission gear fixedly secured to an input shaft and transmitting the power from the prime mover through the hydraulic transmission gear to the output shaft according to a signal transmitted by said control unit. When the rotational speed of the output shaft is higher than the predetermined value, the method includes the steps of connecting the clutch of the mechanical transmission gear to thereby transmit the power from the prime mover through the mechanical transmission gear to the output shaft according to a signal transmitted by the control unit, and minimizing the power required by the hydraulic transmission gear according to a command from the control unit.

To achieve the above-mentioned objects, according to a second aspect of the present invention, there is provided a method of controlling power transmission using a mechanical-hydraulic transmission gear system as set forth in the first aspect, characterized in that to minimize the power required by the hydraulic transmission gear, the discharge of fluid from the hydraulic pump and from the hydraulic motor are reduced to zero by actuating displacement control devices of the pump and the motor according to a command from the control unit.

To achieve the above-mentioned objects, according to a third aspect of the present invention, there is provided a method of controlling power transmission using a mechanical-hydraulic transmission gear system including a prime mover having a speed control means; a hydraulic transmission gear having a variable displacement hydraulic pump and a variable displacement hydraulic motor; a control unit; and a mechanical transmission gear, characterized in that, when the rotational speed of an output shaft is lower than a predetermined value, the method includes the steps of disconnecting a clutch of the mechanical transmission gear fixedly secured to an input shaft and also connecting a clutch of the hydraulic transmission gear to thereby transmit the power from the prime mover through the hydraulic transmission gear to the output shaft according to a signal transmitted by the control unit. When the rotational speed of the output shaft is higher than the predetermined value, the method includes the steps of connecting the clutch of the mechancial transmission gear and also disconnecting the clutch of the hydraulic transmission gear to thereby transmit the power from the prime mover through the mechanical transmission gear to the output shaft according to a signal transmitted by the control unit, and minimizing the power required by the hydraulic transmission gear according to a command from the control unit.

To achieve the above-mentioned objects, according to a fourth aspect of the present invention, there is provided a method of controlling power transmission using a mechanical-hydraulic transmission gear system as set forth in the third aspect, characterized in that to minimize the power required by the hydraulic transmission gear, the discharge of fluid from the hydraulic pump and from the hydraulic motor are reduced to zero by actuating displacement control devices of the pump and the motor according to a command from the control unit.

To achieve the above-mentioned objects, according to a fifth aspect of the present invention, there is provided a method of controlling power transmission using a mechanical-hydraulic transmission gear system as set forth in the third aspect, characterized in that to minimized the power required by the hydraulic transmission gear, the rotation of at least one of the hydraulic pump and the hydraulic motor is stopped by means of the clutch thereof according to a command from the control unit.

To achieve the above-mentioned objects, according to a sixth aspect of the present invention, there is provided a method of controlling power transmission using a mechanical-hydraulic transmission gear system including a prime mover having a speed control means; a hydraulic transmission gear having a variable displacement hydraulic pump and a variable displacement hydraulic motor; a control unit; and a mechanical transmission gear. When the rotational speed of an output shaft is lower than a predetermined value, the method includes the steps of disconnecting a clutch of the mechanical transmission gear fixedly secured to an input shaft and also connecting a clutch of the hydraulic transmission gear to thereby transmit the power from the prime mover through the hydraulic transmission gear to the output shaft according to a signal transmitted by the control unit, and changing over the rotational direction of the output shaft by actuating a hydraulic valve provided in a fluid passage connected between the pump and the motor and adapted to be changed over according to a signal transmitted by the control unit. When the rotational speed of the output shaft is higher than the predetermined value, the method includes the steps of connecting the clutch of the mechanical transmission gear and also disconnecting the clutch of the hydraulic transmission gear to thereby transmit the power from the prime mover through the mechanical transmission gear to the output shaft according to a signal transmitted by the control unit, and minimizing the power required by the hyraulic transmission gear according to a command from the control unit.

To achieve the above-mentioned objects, according to a seventh aspect of the present invention, there is provided a method of controlling power transmission using a mechanical-hydraulic transmission gear system as set forth in the sixth aspect, characterized in that when the hydraulic valve is located at its neutral position and vicinity, the fluid under pressure to be supplied to the hydraulic pump can be supplied to another fluid circuit.

To achieve the above-mentioned objects, according to an eighth aspect of the present invention, there is provided a method of controlling power transmission using a mechanical-hydraulic transmission gear system as set forth in the sixth aspect, characterized in that irrespective of whether or not the hydraulic valve is operated, the fluid under pressure to be supplied to the hydraulic pump can be supplied to another fluid circuit by operating another manual fluid pressure change-over valve provided in a fluid passage connected between the pump and the motor.

To achieve the above-mentioned objects, according to a ninth aspect of the present invention, there is provided a method of controlling power transmission using a mechanical-hydraulic transmission gear system including a prime mover having a speed control means; a hydraulic transmission gear having a variable displacement hydraulic pump and a variable displacement hydraulic motor; a control circuit; a mechanical transmission gear; and a speed increasing and decreasing device. When the rotational speed of an output shaft is lower than a predetermined value, the method includes the steps of disconnecting a clutch of the mechanical transmission gear fixedly secured to an input shaft and transmitting the power from the prime mover through the hydraulic transmission gear and the speed increasing and decreasing device to the output shaft according to a signal transmitted by the control unit. When the rotational speed of the output shaft is higher than the predetermined value, the method includes the steps of connecting the clutch of the mechanical transmission gear to thereby transmit the power from the prime mover through the mechanical transmission gear and the speed increasing and decreasing device (otherwise known as a speed multiplying/reducing gear set) to the output shaft according to a signal transmitted by the control unit, and minimizing the power required by said hyraulic transmission gear according to a command from the control unit.

To achieve the above-mentioned objects, according to a tenth aspect of the present invention, there is provided a method of controlling power transmission using a mechanical-hydraulic transmission gear system as set forth in the ninth aspect, characterized in that to minimize the power required by the hydraulic transmission gear, the discharge of fluid from the hydraulic pump and that from the hydraulic motor are reduced to zero by actuating displacement control devices of the pump and the motor according to a command from the control unit.

To achieve the above-mentioned objects, according to an eleventh aspect of the present invention, there is provided a method of controlling power transmission using a mechanical-hydraulic transmission gear system including a prime mover having a speed control means; a hydraulic transmission gear having a variable displacement hydraulic pump and a variable displacement hydraulic motor; a control unit; a mechanical transmission gear; and a speed increasing and decreasing device. When the rotational speed of an output shaft is lower than a predetermined value, the method includes the steps of disconnecting a clutch of the mechanical transmission gear fixedly secured to an input shaft and also connecting a clutch of the hydraulic transmission gear to thereby transmit the power from the prime mover through the hydraulic transmission gear to the output shaft according to a signal transmitted by the control unit, and changing over the rotational direction of the output shaft by actuating a hydraulic valve provided in a fluid passage connected between the hydraulic pump and the hydraulic motor and adapted to be changed over according to a signal transmitted by the control unit. When the rotational speed of the output shaft is higher than the predetermined value, the method includes the steps of connecting the clutch of the mechanical transmission gear and also disconnecting the clutch of the hydraulic transmission gear to thereby transmit the power from the prime mover through the mechanical transmission gear according to a command from the control unit, and minimizing the power required by the hydraulic transmission gear according to a command from the control unit.

To achieve the above-mentioned objects, according to a twelfth aspect of the present invention, there is provided a method of controlling power transmission using a mechanical-hydraulic transmission gear system as set forth in the eleventh aspect, characterized in that to minimize the power required by the hydraulic transmission gear, the discharge of fluid from the hydraulic pump and that from the hydraulic motor are reduced to zero by actuating displacement control devices of the pump and the motor according to a command from the control unit.

To achieve the above-mentioned objects, according to a thirteenth aspect of the present invention, there is provided a method of controlling power transmission using a mechanical-hydraulic transmission gear as set forth in the eleventh aspect, characterized in that to minimize the power required by the hydraulic transmission gear, the rotation of at least one of the hydraulic pump and the hydraulic motor is stopped by means of the clutch thereof according to a command from the control unit.

To achieve the above-mentioned objects, according to a fourteenth aspect of the present invention, there is provided a method of controlling power transmission using a mechanical-hydraulic transmission gear system as set forth in the eleventh aspect, when the hydraulic valve is located at its neutral position and vicinity, the fluid under pressure to be supplied to the hydraulic pump can be supplied to another fluid circuit.

To achieve the above-mentioned objects, according to a fifteenth aspect of the present invention, there is provided a method of controlling power transmission using a mechanical-hydraulic transmission gear system as set forth in the eleventh aspect, characterized in that irrespective of whether or not the hydraulic valve is operated, the fluid under pressure to be supplied to the hydraulic pump can be supplied to another fluid circuit by operating another manual fluid pressure change-over valve provided in a passage connected between the hydraulic pump and the hydraulic motor.

To achieve the above-mentioned objects, according to a sixteenth aspect of the present invention, there is provided a method of controlling power transmission using a mechanical-hyraulic transmission gear system as set forth in the eleventh aspect, characterized in that at the step of changing over the rotational direction of the output shaft by actuating the hydraulic valve, the rotational speed of the output shaft is controlled at the same time.

To achieve the above-mentioned objects, according to a seventeenth aspect of the present invention, there is provided a mechanical-hydraulic transmission gear system for use in a construction vehicle including a prime mover having a speed control unit; a hydraulic transmission gear having a variable displacement hydraulic pump and a variable displacement hydraulic motor; a control unit; and a mechanical transmission gear. The gear system further comprises a change-over means for changing forward running of the vehicle over to reversing and vice versa; a speed control means for controlling the running speed of the vehicle; a sensor for sensing the rotational speed of an output shaft; and a control means for comparing the signals transmitted by the change-over means. The speed control means and the sensor means for the output shaft effect control of connection and disconnection of the clutch mounted on an input shaft of the mechanical transmission gear and effect control of increase and decrease of the displacement of each of the pump and the motor.

To achieve the above-mentioned objects, according to an eighteenth aspect of the present invention, there is provided a mechanical-hydraulic transmission gear system for use in a construciton vehicle including a prime mover having a speed control unit; a hydraulic transmission gear having a variable displacement hydraulic pump and a variable displacement hydraulic motor; a control unit; and a mechanical transmission gear. The gear system further comprises a change-over means for changing forward running of the vehicle over to reversing and vice versa; a hydraulic valve provided in a fluid passage connected between the pump and the motor and adapted to change over the rotational direction of an output shaft and also change over the flow of fluid under pressure so as to flow into another fluid circuit according to a signal transmitted by the change-over means; a speed control means for controlling the running speed of the vehicle; a sensor means for sensing the rotational speed of the output shaft; and a control means for comparing the signals transmitted by the change-over means. The speed control means and the sensor means for the output shaft effect control of connection and disconnection of the clutch mounted on an input shaft of the mechanical transmission gear and effect control of increase and decrease of the displacement of each of the pump and the motor.

To achieve the above-mentioned objects, according to a nineteenth aspect of the present invention, there is provided a mechanical-hydraulic transmission gear system for use in a construction vehicle including a prime mover having a speed control means; a hydraulic transmission gear having a variable displacement hydraulic pump and a variable displacement hydraulic motor; a control unit; and a mechanical transmission gear. The gear system further comprises a change-over means for changing forward running of the vehicle over to reversing and vice versa; a speed control means for controlling the running speed of the vehicle; a sensor means for sensing the rotational speed of an output shaft; and a control means for comparing the signals transmitted by the chang-over means, the speed control means and the sensor means for the output shaft effect control of connection and disconnection of the clutches of the mechanical transmission gear and the hydraulic transmission gear and effect control of increase and decrease of the displacement of each of the pump and the motor.

To achieve the above-mentioned objects, according to a twentieth aspect of the present invention, there is provided a mechanical-hydraulic transmission gear system for use in a construction vehicle including a prime mover having a speed control means; a hydraulic transmission gear having a variable displacement hydraulic pump and a variable displacement hydraulic motor; a control unit; and a mechanical transmission gear. The gear system further comprising a change-over means for changing forward running of the vehicle over to reversing and vice versa; a hydraulic valve provided in a fluid passage connected between the pump and the motor and adapted to change over the rotational direction of an output shaft and also change over the flow of fluid under pressure so as to flow into another fluid circuit according to a signal transmitted by the change-over means; a speed control means for controlling the running speed of the vehicle; a sensor means for sensing the rotational speed of the output shaft; and a control means for comparing the signals transmitted by the change-over means. The speed control means and the sensor means for the output shaft so as to effect control of connection and disconnection of the clutches of the mechanical transmission gear and the hydraulic transmission gear and effect control of increase and decrease of the displacement of each of the pump and the motor.

To achieve the above-mentioned objects, according to a twenty-first aspect of the present invention, there is provided a mechanical-hydraulic transmission gear system for use in a construction vehicle including a prime mover having a speed control means; a hydraulic transmission gear having a variable displacement hydraulic pump and a variable displacement hydraulic motor; a control unit; and a mechanical transmission gear. The gear system further including a change-over means for changing forward running of the vehicle over to reversing and vice versa; a speed control means for controlling the running speed of the vehicle; a sensor means for sensing the rotational speed of an output shaft; and a control means for comparing the signals transmitted by the change-over means, the speed control means and the sensor means for the output shaft so as to effect control of connection and disconnection of the clutches of the mechanical transmission gear and the hydraulic transmission gear and effect control of increase and decrease of the displacement of each of the pump and/or the motor.

To achieve the above-mentioned objects, according to a twenty-first aspect of the present invention, there is provided a mechancial-hydraulic transmission gear system for use in a construction vehicle including a prime mover having a speed control means; a hydraulic transmission gear having a variable displacement hydraulic pump and a variable displacement hydraulic motor; a control unit; and a mechanical transmission gear. The gear system further comprising a change-over means for changing forward running of the vehicle over to reversing and vice versa; a first hydraulic valve provided in a fluid passage connected between the pump and the motor and adapted to change over the rotational direction of an output shaft and also control the rotational speed of the output shaft according to a signal transmitted by the control unit; a second hydraulic valve provided in a fluid passage connected between the pump and the motor and adapted to change over the fluid under pressure to be supplied to the pump so as to flow into another fluid circuit; a speed control means for controlling the running speed of the vehicle; a sensor means for sensing the rotational speed of the output shaft; and a control means for comparing the signals transmitted by the change-over means. The speed control means and the sensor means for the output shaft effect control of connection and disconnection of the clutches of the mechanical transmission gear and the hydraulic transmission gear and effect control of increase and decrease of the displacement of the pump and/or the motor.

Principal advantages of the present invention having the above-mentioned aspects are as follows:

(1) During high speed rotation, only mechanical power transmission is effected and the power loss due to fluid pressure is reduced substantially to zero.

(2) During low speed rotation, changes in the number of the revolutions of output shaft from forward rotation to reversing and vice versa are controlled smoothly.

(3) The construction of the power transmission system is very simple and can be manufactured at low cost, because it does not use the planetary gear system.

(4) The whole power transmission system can be made compact.

(5) In case the fluid discharged by the hydraulic pump is supplied into another actuator by changing over the hydraulic circuit, the energy of fluid under pressure can be utilized without extra power losses.

(6) Change-over from the hydraulic transmission gear to the mechanical transmission gear and vice versa, and change-over in each of the mechanical and hydraulic transmission gears can be carried out smoothly by detecting the rotational speed of the output shaft, the degree of opening of the throttle and changes in shift position and by controlling the fluid pressure to be supplied to the clutches by means of the control unit.

The above-mentioned and other objects, aspects and advantages of the present invention will become apparent to those skilled in the art by making reference to the following description and the accompanying drawings in which preferred embodiments incorporating the principles of the present invention are shown by way of example only.

BRIEF DESCRIPTION OF THE DRAWINGS

FIGS. 10A and 10B are graphs showing the relationship between the rotational speed of the output shaft and the degree of opening of the throttle of a prime mover, and the relationship between the rotational speed of the output shaft and the torque on the output shaft, respectively;

FIG. 11 is a table showing clutch engagement patterns;

FIG. 18 is a schematic overall configurational view showing the seventh embodiment of the present invention;

FIG. 19 is a flowchart showing the operation of the seventh embodiment of the present invention shown in FIG. 18;

FIG. 21 is a graph showing the relationship between the rotational speed of the output shaft and the discharge of fluid from the hydraulic motor;

FIG. 22 is a graph showing the relationship between the rotational speed of the hydraulic motor and the discharge of fluid from the hydraulic motor;

FIG. 23 is a table showing clutch engaging patterns; and

FIG. 24 is a tabular form showing combinations of a hydraulic transmission (H) and a mechanical transmission (M) at each of speed stages in the sixth and seventh embodiments of the present invention and examples of application.

DETAILED DESCRIPTION OF PREFERRED EMBODIMENTS

Figure 1:
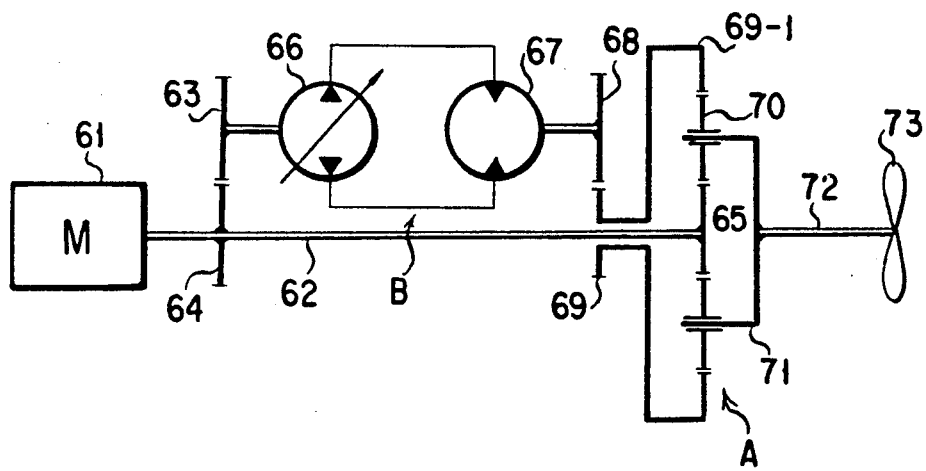
FIGS. 1 and 2 are schematic overall configurational views showing a mechanical-hydraulic transmission gear and a hydraulic transmission gear, respectively, as prior art examples.
Figure 2:
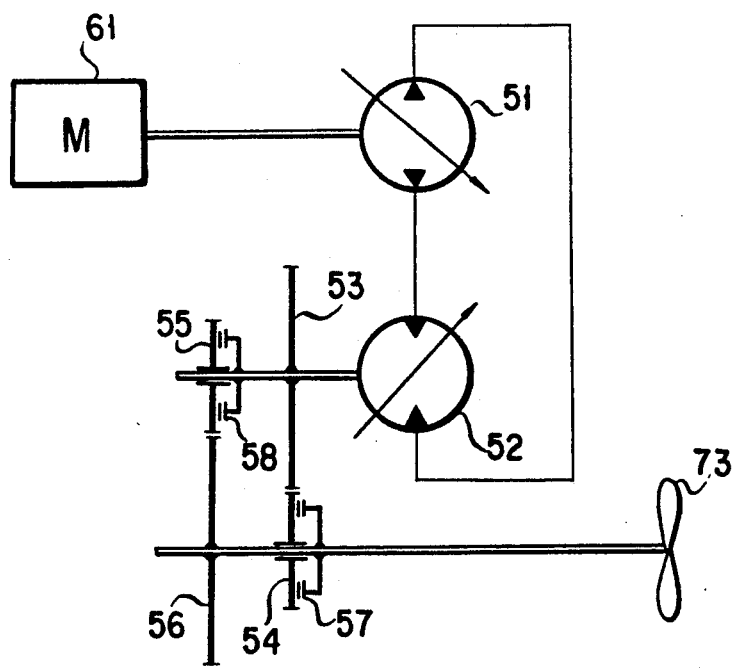
Figure 3:
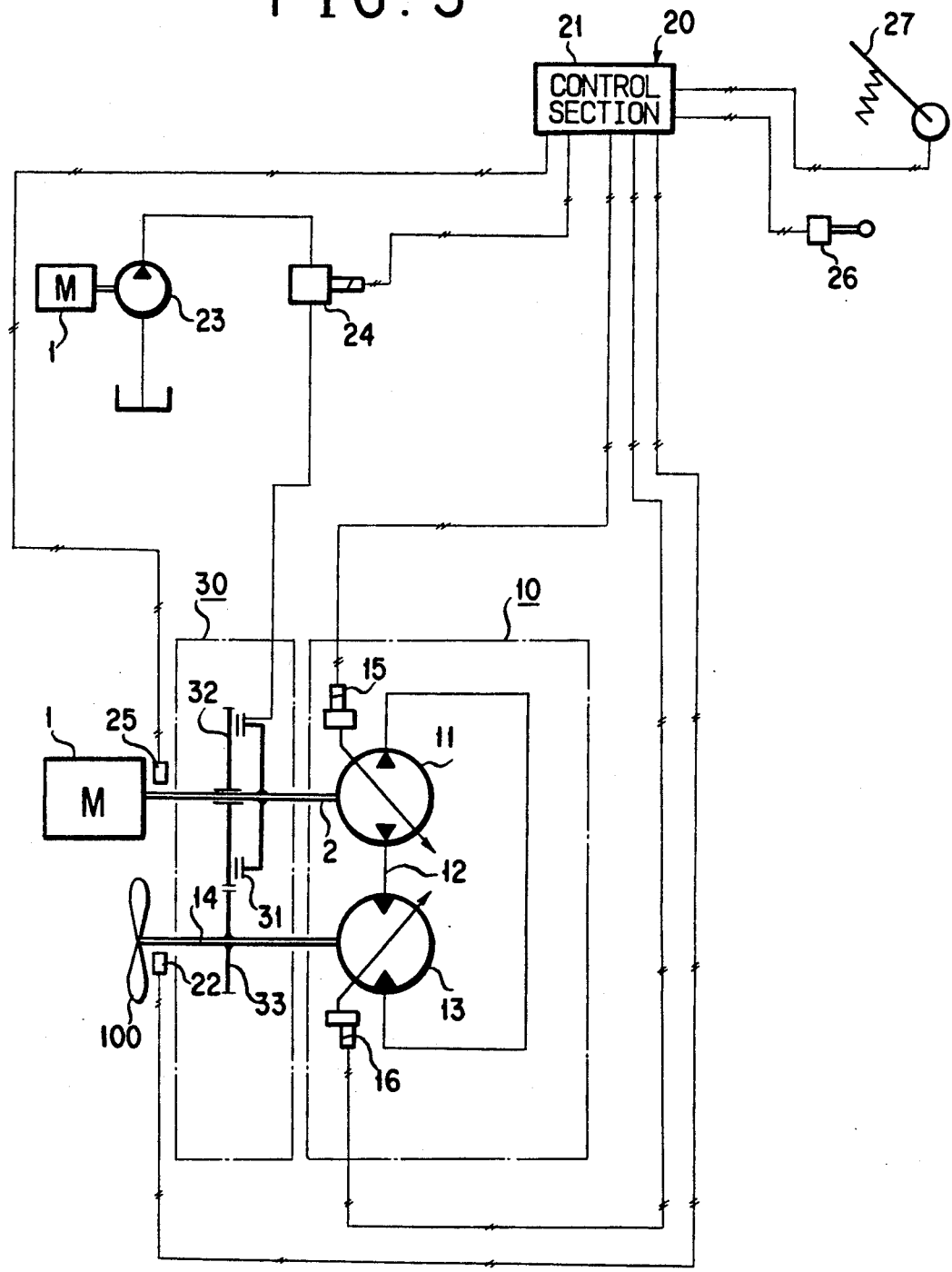
FIGS. 3 to 8 are schematic overall configurational views showing first to sixth embodiments, respectively, of the present invention.

The present invention will now be described by way of embodiments thereof with reference to the accompanying drawings;

FIG. 3 is a schematic overall configurational view of a mechanical-hydraulic gear system showing the first embodiment of the present invention, which comprises a prime mover 1 having a speed control means, a hydraulic transmission gear 10, a control section 20, and a mechanical transmission gear 30. The hydraulic transmission gear 10 comprises a variable displacement hydraulic pump 11 (which is referred to simply as "pump" below) connected through an input shaft 2 to the prime mover 1 so as to be driven by the latter; and a variable displacement hydraulic motor 13 (which is referred to simply as "motor" below) connected to the pump 11 by piping 12 and which is connected to an output shaft 14 adapted to be driven by the motive power developed by the motor 13. The pump 11 and the motor 13 are provided with discharge control valves 15 and 16, respectively, adapted to vary the discharge of fluid from the pump 11 and the direction of flow of fluid discharged thereby and the discharge of fluid from the motor 13 according to a command from the control section 21. The input shaft 2 and the output shaft 14 are provided with speed sensors 25 and 22, respectively, so as to feed back the number of revolutions thereof to the control section 21. The mechanical transmission gear 30 comprises a clutch 31 fixedly secured to the input shaft 2, a gear 32 rotatably mounted on the input shaft 2, and a gear 33 meshing with the gear 32 and fixedly secured to the output shaft 14, and is arranged such that it may be supplied with fluid under pressure from a pump 23 through a clutch pressure controlling valve 24 which is under control of the control section 21, thereby connecting the clutch 31 and rotating the output shaft 14. The control section 21 comprising a controller or control unit is provided with a change-over means 26 such as a change lever for changing forward running of a construction vehicle over to reversing and vice versa, and a speed control means 27 such as an accelerator pedal for controlling the running speed of the vehicle, both of which constitute a control unit 20.

The operation of the first embodiment having the above-mentioned configuration will be described below. When the rotational speed of the motor 13 or the output shaft 14 is lower than a predetermined value, the control section 21 transmits a signal to the clutch pressure controlling valve 24 so as to disconnect the clutch 31 of the mechanical transmission gear 30 fixedly secured to the input shaft 2, and the hydraulic transmission gear 10 transmits power to the output shaft 14 so as to drive a starting wheel 100 mounted on the body of a construction vehicle, not shown. At that time, the speed control means 27 such as the accelerator pedal transmits a signal to the control section 21 which transmits, in turn, a signal to the valve 15 for controlling the discharge of fluid from the pump 11 and the valve 16 for controlling the discharge of fluid from the motor 13 to thereby control the discharge of fluid from the pump 11 and the motor 13, respectively, so that the rotational speed of the motor 13 or the output shaft 14 can be set at will without having to control the rotational speed of the prime mover 1. Further, the change-over means 26 such as the change lever, etc for changing forward running of the construction vehicle over to reversing and vice versa transmits a signal to the control section 21 which transmits, in turn, a command signal to the pump 11 to thereby set the discharge of fluid from the pump 11 in a negative zone to reverse the direction of fluid discharged by the pump 11 so that the rotational direction of the output shaft 14 can be reversed. Therefore, when the rotational speed of the output shaft 14 is lower than a predetermined value, the rotational speed of the output shaft during its forward and reverse rotation can be controlled smoothly. While, when the rotational speed of the motor 13 or the output shaft 14 is higher than a predetermined value and when the motor or the output shaft is rotating forward or control of forward rotation is made, the control section 21 transmits a signal to the clutch pressure controlling valve 24 so as to connect the clutch 31 of the mechanical transmission gear 30 fixedly secured to the input shaft 2 to thereby transmit the power through the gears 32 and 33 to the output shaft 14. At that time, the control section 21 transmits a command signal to the valve 15 for controlling the discharge of fluid from pump 11 and the valve 16 for controlling the discharge of fluid from motor 13 to actuate them, thereby reducing the discharge of fluid from pump 11 and motor 13, respectively, to zero. As a result, the power required by the pump 11 and the motor 13, respectively, is minimized, and the power developed by the prime mover 1 is transmitted to the output shaft 14 only through the mechanical transmission gear 30 having an excellent power transmission efficiency. The speed control at that time is made by a speed control means, not shown, of the prime mover 1 adapted to be actuated by a signal which is tranmitted by the control section 21 when it receives a signal transmitted by the speed control means 27 such as the accelerator pedal, etc.

Figure 4:
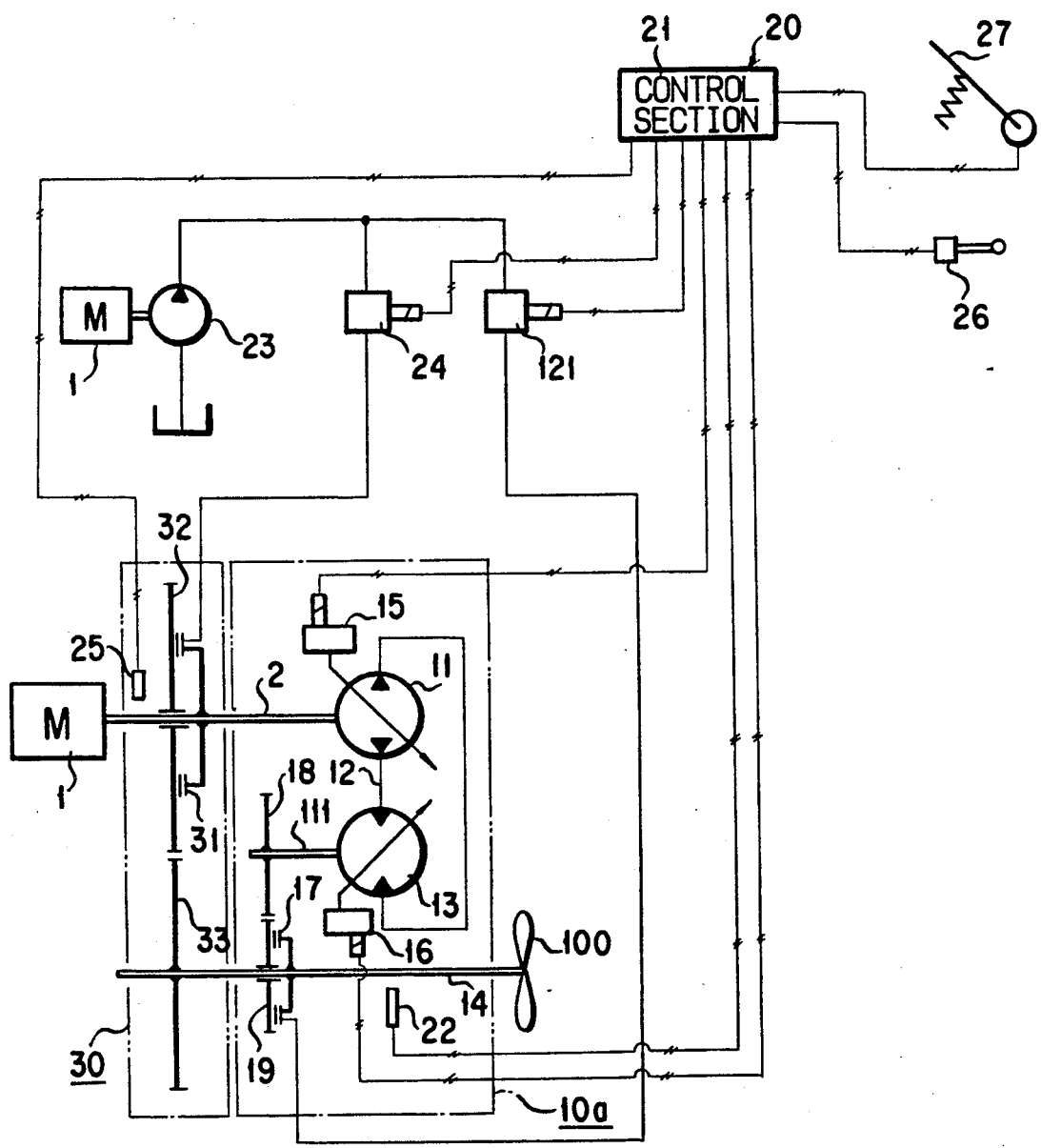

FIG. 4 is a schematic overall configurational view showing the second embodiment of the present invention. In this drawing, the same component parts as those in the above-mentioned first embodiment are denoted with the same reference numerals and characters, and therefore the description thereof is omitted herein.

In this second embodiment, the power developed by a hydraulic motor 13 of a hydraulic transmission gear 10a is transmitted to an output shaft 14 through a gear 18 fixedly secured to a rotating shaft 111 of the hydraulic motor 13, a gear 19 rotatably mounted on the output shaft 14, and a clutch 17 fixedly secured to the output shaft 14. The clutch 17 is supplied with fluid under pressure discharged by a pump 23 driven by the prime mover 1 through a clutch pressure controlling valve 121 which is under control of the control section 21, so that it is connected so as to rotate the output shaft 14.

The operation of the second embodiment having the above-mentioned configuration will be described below.

When the rotational speed of the motor 13 or the output shaft 14 is lower than a predetermined value, the control section 21 transmits a signal to a clutch pressure controlling valve 24 and a clutch pressure controlling valve 121 so as to disconnect a clutch 31 of a mechanical transmission gear 30 and connect a clutch 17 of a hydraulic transmission gear 10a to transmit the power from the prime mover 1 through the hydraulic transmission gear 10a to the output shaft 14, thereby driving a starting wheel 100 mounted on the body of a construction vehicle, etc not shown.

Setting of the rotational speed of the motor 13 or the output shaft 14 at any desired value and change-over of the rotational direction of the output shaft 14 from forward to backward and vice versa can be made in the same manner as that in the case of the first embodiment, and therefore the description thereof is omitted herein.

In case the rotational speed of the pump 11 and the output shaft 14 are higher than their respective predetermined values, and when the pump and the output shaft are rotating forward or control of the forward rotation is made, the control section 21 transmits a signal to the clutch pressure controlling valve 24 of the clutch 31 and the clutch pressure controlling valve 121 of the clutch 17 so as to connect the clutch 31 of the mechanical transmission gear 30 and disconnect the clutch 17 of the hydraulic transmission gear 10a, thereby transmitting the power to the output shaft 14. At that time, the control section 21 transmits a command signal to the valve 15 for controlling the discharge of fluid from the pump 11 to thereby actuate the valve 15 and reduce the discharge of fluid from the pump 11 to zero.

In consequence, the power required by the pump 11 is minimized and the power developed by the prime mover 1 is transmitted to the output shaft 14 only through the mechanical transmission gear 30 having an excellent power transmission efficiency. The speed control at that time is made by a speed control means, not shown, of the prime mover 1 adapted to be actuated by a signal which is transmitted by the control section 21 when it receives a signal transmitted by the speed control means 27 such as the accelerator pedal, etc.

Figure 5:
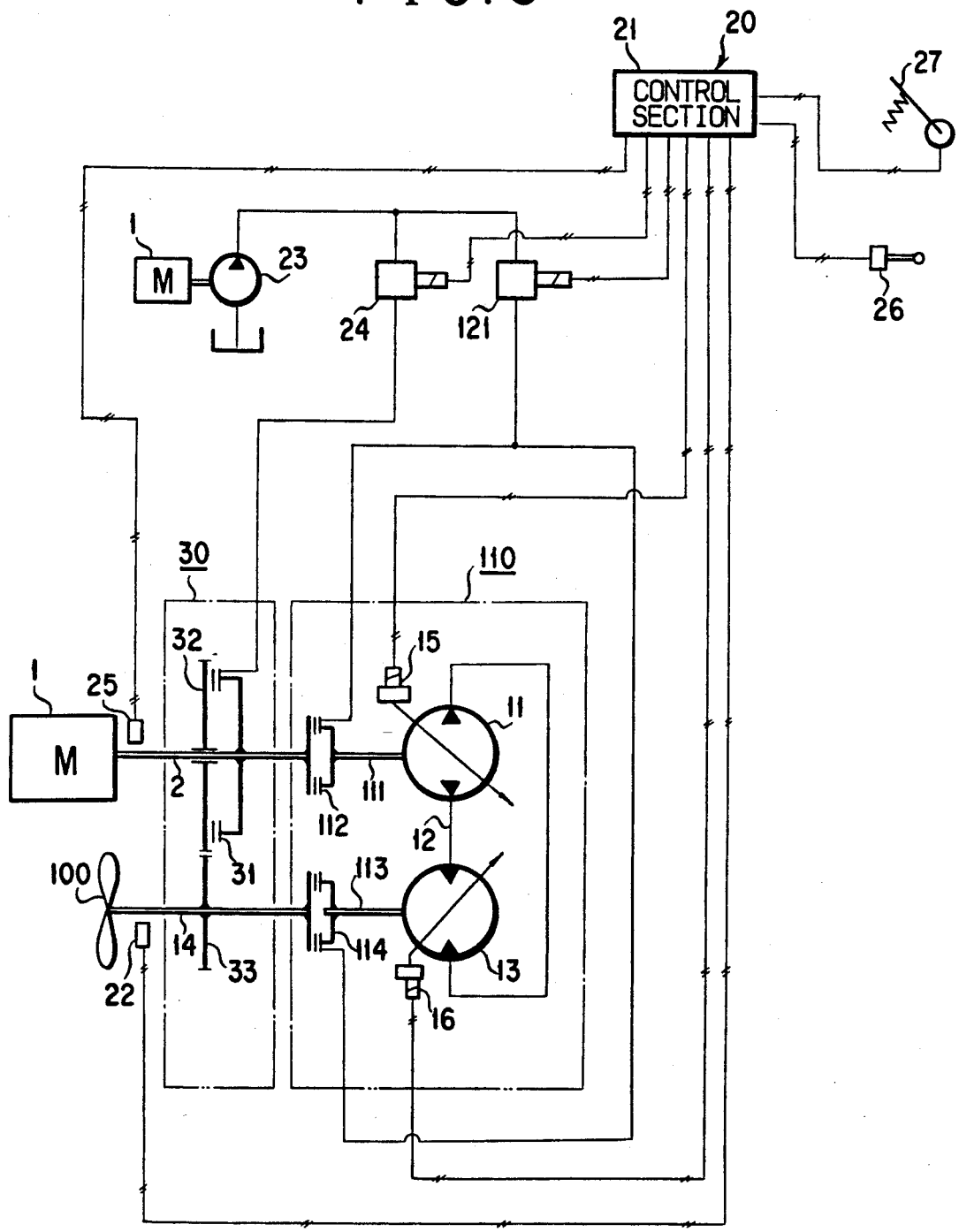

FIG. 5 shows the third embodiment of the present invention. In this drawing, the same component parts as those in the first embodiment are denoted with the same reference numerals and characters, and so the description thereof is omitted herein. In a hydraulic transmission gear 110, a pump shaft 111 of a pump 11 connected through an input shaft 2 to a prime mover 1 so as to be driven by the latter is provided with a clutch 112. Further, the power developed by a motor 13 is transmitted to an output shaft 14 through a clutch 114 mounted on a motor shaft 113. Each of the clutches 112 and 114 is connected when it is supplied with fluid under pressure discharged by the pump 23 through the clutch pressure controlling valve 121 which is under control of the control section 21.

In the above-mentioned configuration, when the rotational speed of the motor 13 or the output shaft 14 is lower than a predetermined value, the control section 21 transmits a command signal to a clutch pressure controlling valve 24 so as to disconnect a clutch 31 of a mechanical transmission gear 30 fixedly secured to the input shaft 2. In addition, the control section 21 transmits a signal to the clutch pressure controlling valve 121 so as to connect the clutches 112 and 114. As a result, the power is transmitted by the hydraulic transmission gear 110 to the output shaft 14 so as to drive a starting wheel 100 mounted on the body of a construction vehicle, not shown.

In case the rotational speed of the pump 11 and the output shaft 14 are higher than the respective predetermined values and when the pump and the output shaft are rotating forward or control of the forward rotation is made, the control section 21 transmits a signal to the clutch pressure controlling valve 24 so as to connect the clutch 31 of the mechanical transmission gear 30 fixedly secured to the input shaft 2, and also the control section 21 transmits a signal to the clutch pressure controlling valve 121 so as to disconnect the clutches 112, 114, to thereby enable the power to be transmitted to the output shaft 14 by the mechanical transmission gear 30. As a result, the pump 11 and the motor 13 are not rotated, so that the power required by the hydraulic transmission gear can be reduced to zero and the power developed by the prime mover 1 can be transmitted to the output shaft 14 only through the mechanical transmission gear 30 having an excellent power transmission efficiency. While in this embodiment the clutches 112 and 114 are mounted on the hydraulic transmission gear 110, they may be mounted on the mechanical transmission gear 30.

Figure 6:
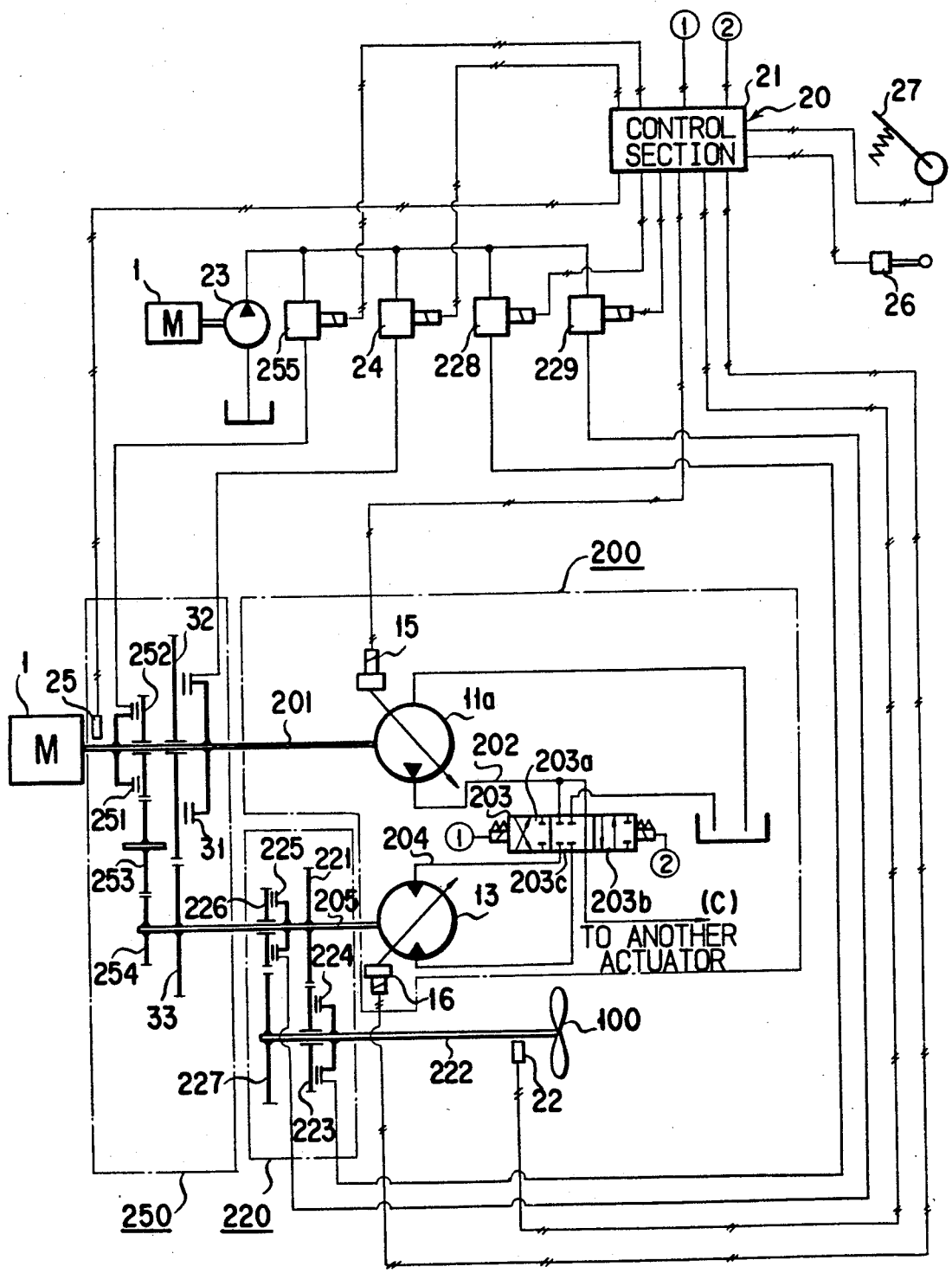

FIG. 6 shows the fourth embodiment of the present invention. In this drawing, the same component parts as those in the first embodiment are denoted with the same reference numerals and characters and therefore the description thereof is omitted herein. A hydraulic transmission gear 200 comprises a one-side discharge type pump 11a connected through an input shaft 201 to the prime mover 1 so as to be driven by the latter, and a motor 13 connected through a piping 202, a hydraulic valve 203 and a piping 204 to the pump 11a. The arrangement is made such that the power developed by the motor 13 may be transmitted to an output shaft 222 through a gear 221 for a speed increasing and decreasing device (speed multiplying/reducing gear set) 220 fixedly secured to a motor shaft 205, a gear 223 rotatably mounted on the output shaft 222 and a clutch 224 fixedly secured to the output shaft 222 or a clutch 225 fixedly secured to a shaft 205, a gear 226 rotatably mounted on the shaft 205, and a gear 227 fixedly secured to the output shaft 222, thereby driving the output shaft 222. The pump 11a and the motor 13 are provided with valves 15 and 16, respectively, for controlling the discharge of fluid by a swash plate so that the discharge of fluid from the pump 11a and the discharge of fluid from the motor 13 may be changed according to a command from the control section 21. The hydraulic valve 23 is provided with a port 203a for running the vehicle forward, a port 203b for running the vehicle backward, and a port 203c for supplying fluid to another hydraulic actuator (c). The clutches 224 and 225 are supplied with fluid under pressure discharged by the pump 23 driven by the prime mover 1 through clutch pressure controlling valves 228 and 229, respectively, which are under control of the control section 21 so as to connect the clutch 224 or the clutch 225 to thereby rotate the output shaft 222. The output shaft 222 is provided with a speed sensor 22 to feed back the number of revolutions thereof to the control section 21. A mechanical transmission gear 250 comprises, in addition to the power transmission elements such as the gears provided in the first embodiment, a clutch 251 fixedly secured to the input shaft 201, a gear 225 rotatably mounted on the input shaft 201, an intermediate gear 253, and a gear 254 fixedly secured to the shaft 205. In the mechancial transmission gear 250, the fluid under pressure discharged by the pump 23 is supplied either to the clutch 31 through the clutch pressure controlling valve 24 or to the clutch 251 through the clutch pressure controlling valve 255 under the control of the control section 21 so as to connect either the clutch 31 or the clutch 251 thereby rotating the shaft 205. The rotation of the shaft 205 is transmitted through the speed increasing and reducing device 220 to the output shaft 222 to thereby rotate the same. The input shaft 201 is provided with a sensor 25 so as to feed back the number of revolutions thereof to the control section 21. The control section 21 is provided with a change-over means 26 for changing the forward running of a construction vehicle, etc over to reversing and vice versa and changing over the fluid to be supplied to the pump to flow into another actuator such as an implement, and a speed control means 27 such as accelerator pedal, etc for controlling the running speed of the vehicle.

In the above-mentioned configuration, in case it is desired to run the vehicle forward or backward when the rotational speed of the motor 13 or the output shaft 222 is lower than a predetermined value, the change-over means 26 is changed over so as to send a signal to the control section 21 which transmits, in turn, a signal for changing over the hydraulic valve 203. Upon receipt of the signal, the hydraulic valve 203 is changed over either to the port 203a for running the vehicle forward or to the port 203b for running the vehicle backward so as to change over the direction of flow of the fluid under pressure from the pump 11a to the motor 13, thereby driving the vehicle forward or backward. At that time, the clutches 31, 251 of the mechanical transmission gear 250 are disconnected, and either one of the clutches 224, 225 of the speed increasing and decreasing device 220 is connected according to a command from the control section 21 in such a way as to match the rotational speed of the output shaft 222 to thereby transmit the power by the hydraulic transmission gear 200 to the output shaft 222. The speed control of the output shaft 222 is made by a combination of the discharge ratio between the pump 11a and the motor 13 and a gear ratio between gears 221 and 223 or a gear ratio between gears 226 and 227, all of which are stored in the control section 21 according to a signal transmitted by the speed control means 27 such as the accelerator pedal, etc. When the change-over means 26 is not changed over and the hydraulic valve 203 is located at its neutral port 203c, power is not transmitted to the output shaft 222 so that the fluid discharged by the pump 11a may be supplied to another hydraulic actuator, etc. Further, in this embodiment, when the rotational speeds of the pump 11a and the output shaft 222 are higher than their respective predetermined values, either the clutch 31 or the clutch 251 of the mechanical transmission gear 250 is connected irrespective of whether the output shaft 222 is rotating forward or backward, and also either the clutch 224 or the clutch 225 of the speed increasing and decreasing device 220 is connected. Further, in the same manner as in the case of the first embodiment, by setting the discharge of fluid from the pump 11a and the motor 13, respectively, at zero, the power developed by the prime mover 1 is transmitted to the output shaft 222 only through the mechanical transmission gear 250 having an excellent power transmission efficiency. Further, which of the clutches 31, 251 is to be connected at that time is decided according to a command from the control section 21 which varies depending on a signal from the speed control means 27 such as accelerator pedal, etc and a signal transmitted by the change-over means 26 for changing forward running of the vehicle over to reversing and vice versa.

Although in the above-mentioned embodiment the output shaft 222 is provided with the speed sensor 22 to feed back the number of revolutions thereof to the control section 21, the sensor may be provided on the shaft 205 of the motor 13.

Figure 7:
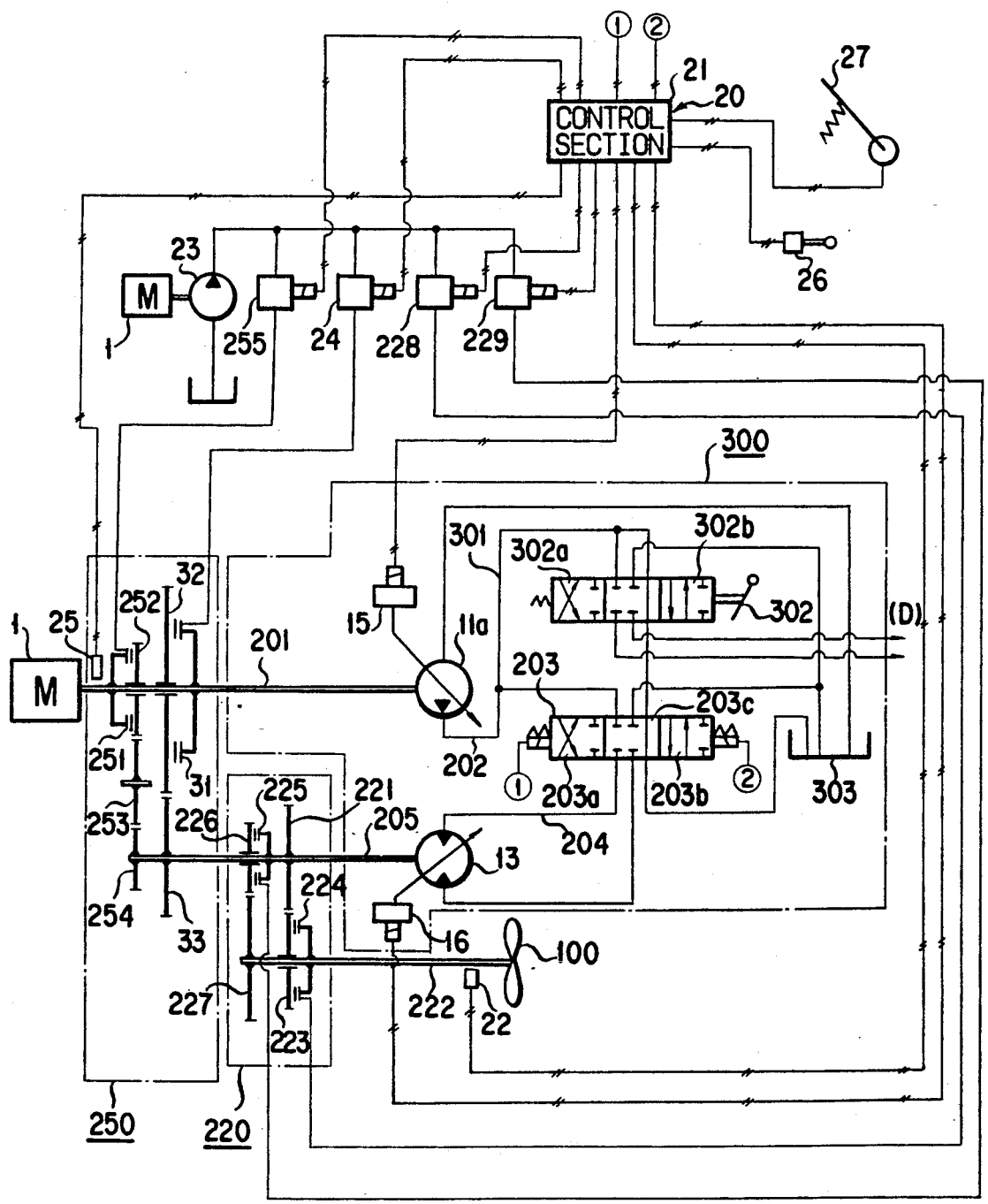

FIG. 7 shows the fifth embodiment of the present invention. In this drawing, the same component parts thereof as those in the fourth embodiment are denoted with the same reference nuemrals and characters, and therefore the description thereof is omitted herein. A hydraulic transmission gear 300 comprises, in addition to the fourth embodiment including the pump 11a connected through the input shaft 201 to the prime mover 1 so as to driven by the latter and the motor 13 connected through the piping 202, the hydraulic valve 203 and the piping 204 to the pump 11a, a piping 301 branched from the piping 202 and a hydraulic valve 302 connected to the piping 301 and which leads to another hydraulic actuator (D), to which fluid under pressure may be supplied or from which fluid may be returned, thereby driving the actuator. The hydraulic valve 203 is provided with a port 203a for running the vehicle forward, a port 203b for running the vehicle backward, and a neutral port 203c. When the hydraulic valve 203 is located at neutral position, the fluid is returned to a fluid tank 303.

In the above-mentioned configuration, in case a vehicle such as a construction equipment is run forward or backward when the rotational speed of the motor 13 or the output shaft 14 is lower than a predetermined value, the change-over means 26 is changed over so as to send a signal to the control section 21 which transmits, in turn, a signal for changing over the hydraulic valve 203. Upon receipt of the signal, the hydraulic valve 203 is changed over either to the port 203a for running the vehicle forward or to the port 203b for running the vehicle backward so as to change the direction of flow of fluid from the pump 11a to the motor 13 thereby running the vehicle forward or backward. In case it is desired to drive only another actuator (D), the change-over means 26 is not changed over, and the hydraulic valve 302a is rendered operative to supply fluid discharged by the pump 11a either through the port 302a or through the port 302b to the hydraulic actuator to be driven. Further, if the change-over means 206 for running the vehicle forward or backward is then operated, then the vehicle can be driven forward or backward while another hydraulic actuator (D) is being driven. In the aforementioned fourth embodiment and the fifth embodiment, the input shaft 201 is directly connected to the pump 11a and the shaft 205 is directly connected to the motor 13, however, the shaft 201 may be connected through the clutch 112 to the pump 11a, whilst the shaft 205 may be connected through the clutch 114 to the motor 13 in the same manner as in the third embodiment. (Refer to FIG. 5)

Further, in the above-mentioned first to fifth embodiments, the direction of rotation of the output shaft is reversed by transmitting a signal from the change-over means such as the change-over lever for changing forward running of the vehicle to backward running and vice versa to the control section, and transmitting a signal from the control section to the pump to thereby set the displacement of the pump in the negative zone. However, such operation may be effected by setting the displacement of the motor in the negative zone instead. Further, a fixed displacement hydraulic motor may be provided in place of the variable displacement hydraulic motor. Moreover, in the above-mentioned embodiment, the gear ratio of the gears is set at one or two stages, but it may be set at multiple stages instead. Still further, in the embodiment shown, the piping to the clutches is branched, however it is needless to say that a clutch pressure controlling valve may be provided for each of the clutches.

Figure 8:
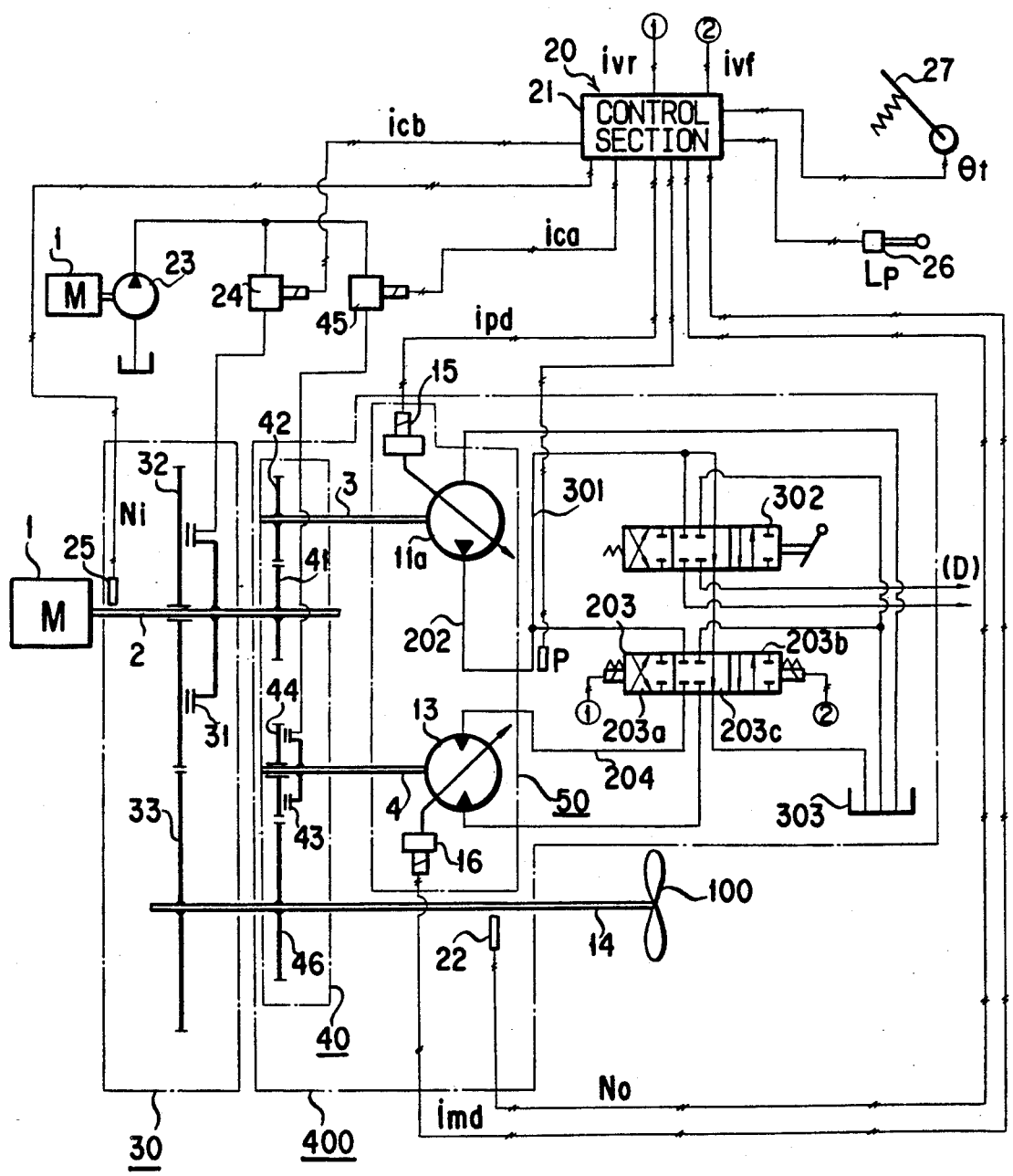

FIG. 8 is a schematic overall configurational view showing the sixth embodiment of the present invention. In this drawing, the same component parts as those in the above-mentioned first embodiment (Refer to FIG. 3) and those in the fifth embodiment (Refer to FIG. 7) are denoted with the same reference numerals and characters, and therefore the description thereof is omitted herein.

A hydraulic transmission type gear 400 comprises a hydraulic transmission gear 50 and a speed increasing and decreasing device 40. The hydraulic transmission gear 50 comprises a variable displacement hydraulic pump 11a (which is referred to simply as "pump 11a" below). The pump 11a is rotated by a pump shaft 3 which is driven through gears 41, 42 of the speed increasing and decreasing device fixedly secured to a shaft 2 driven by the power developed by a prime mover 1. The variable displacement hydraulic motor 13 (which is referred to simply as "motor 13" below) is connected to the pump 11a through a piping 301, a hydraulic valve 203 and a piping 204 so that it may receive fluid under pressure from the pump 11a and generate the power to be transmitted to the motor shaft 4. The power transmitted to the motor shaft 4 is transmitted to the output shaft 14 through a clutch 43 of the speed increasing and decreasing device 40 mounted on the motor shaft 4, a gear 44 rotatably mounted on the motor shaft 4, and a gear 46 fixedly secured to the output shaft 14. When the clutch 43 is supplied with fluid under pressure discharged by a pump 23 through a clutch pressure controlling valve 34 which is under control of a control unit 21, the clutch 43 is connected, thereby rotating the output shaft 14.

The operation of the sixth embodiment having the above-mentioned configuration will be described below.

Figure 9:
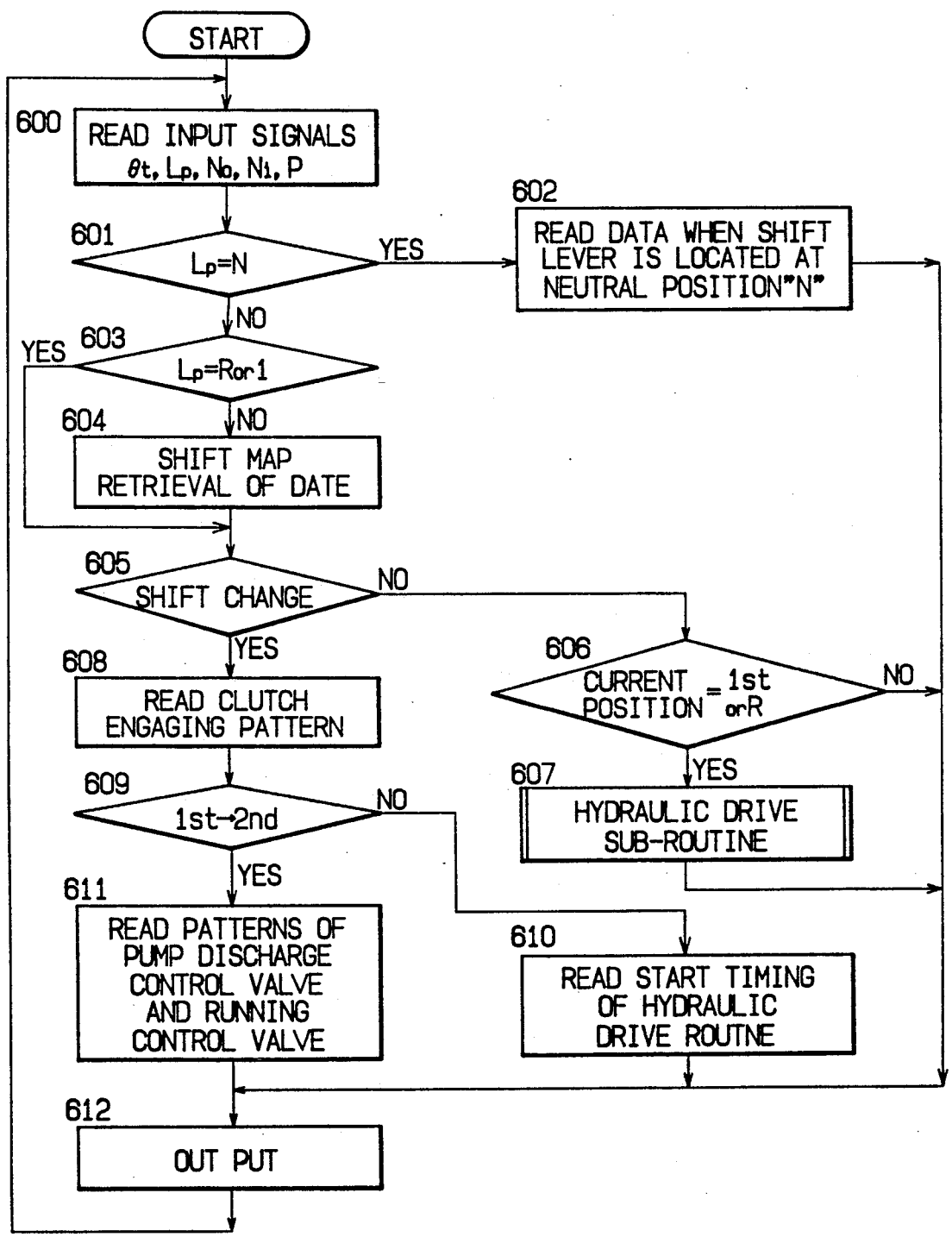
FIG. 9 is a flowchart showing the operation of the sixth embodiment of the present invention as shown in FIG. 8.
Figure 12A:
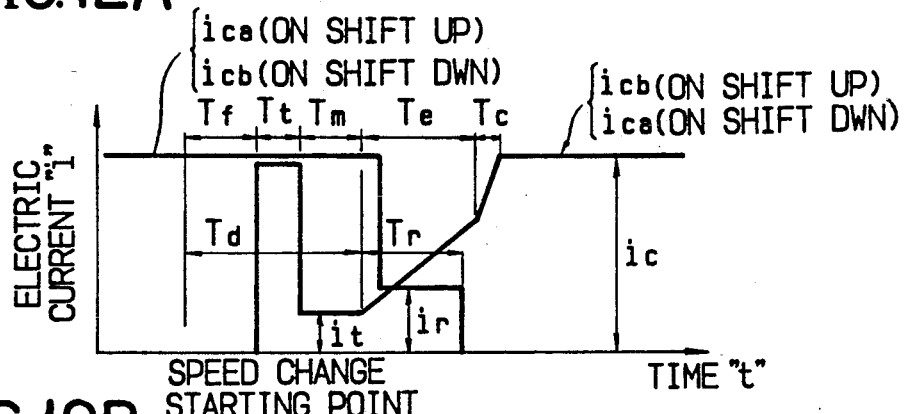
FIGS. 12A to 12D are time charts, respectively, showing shift timing.
Figure 12B:
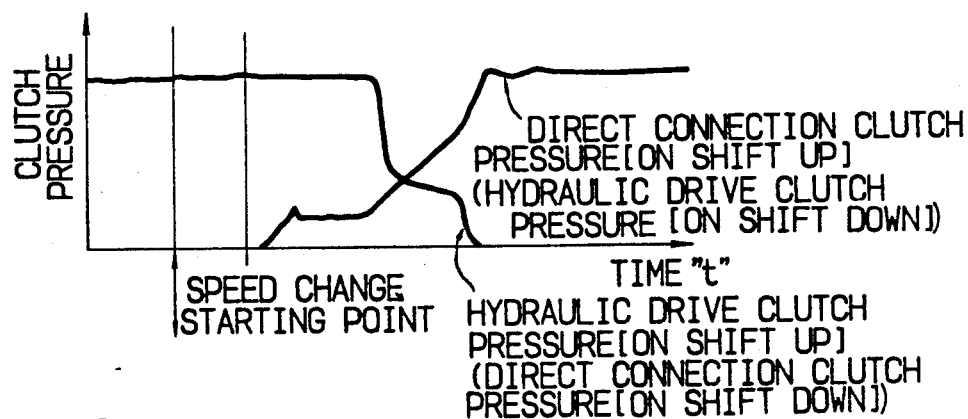
Figure 12C:
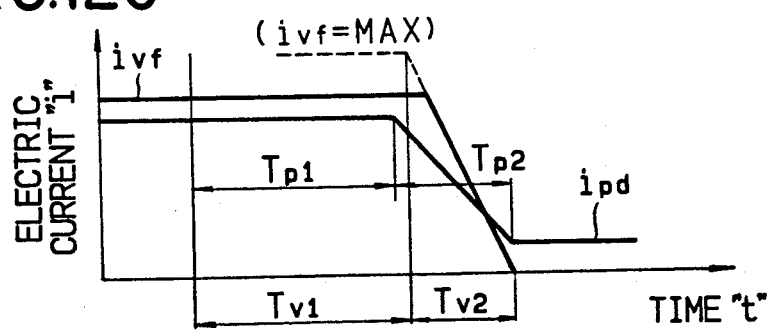
Figure 12D:
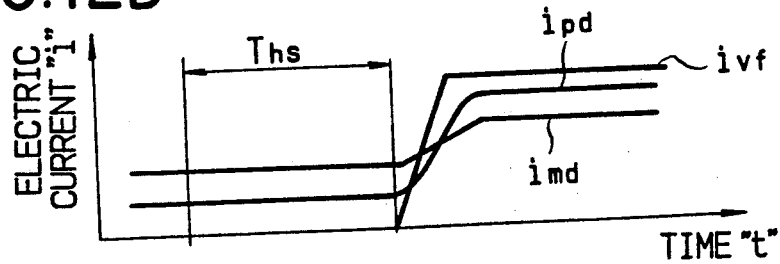
Figure 13:
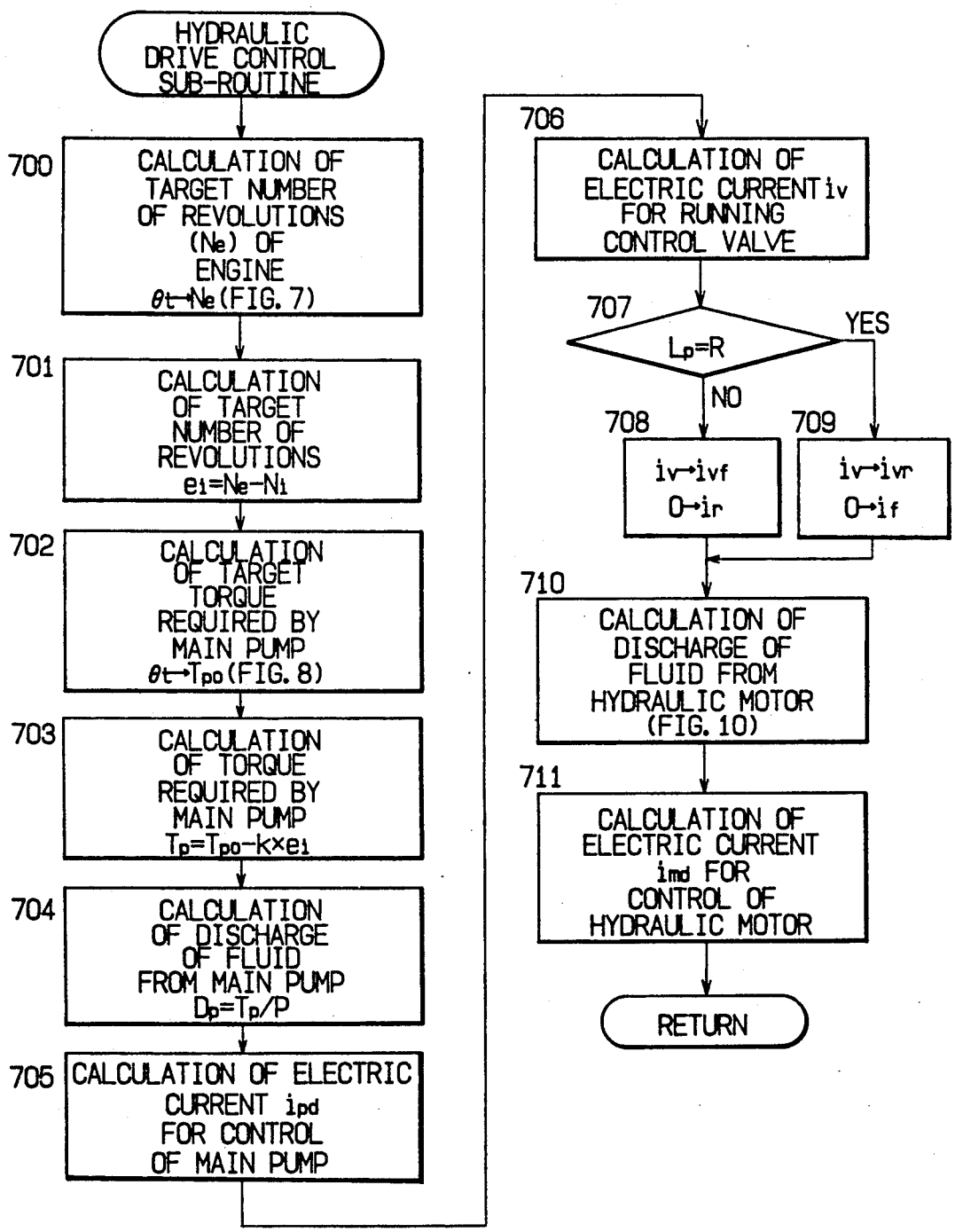
FIG. 13 is a flowchart showing hydraulic drive control operation.
Figure 14:
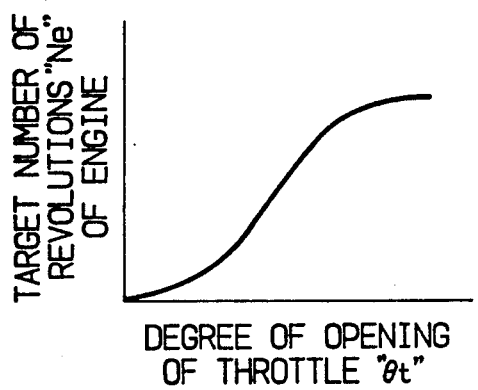
FIGS. 14, 15, 16 and 17 are graphs showing the relationship between the degree of opening of the throttle and the target rotational speed of the engine, the relationship between the degree of opening of the throttle and the target torque required by the hyraulic pump, the relationship between the degree of opening of the throttle and the value of electric current to be supplied to a hydraulic valve (or running control valve) and the relationship between the rotational speed of the output shaft and the discharge of fluid from the hydraulic motor, respectively.

One example of the control operation is described with reference to the flowchart shown in FIG. 9. Further, for example "STEP 600" is abbreviated as "600". At 600, the degree of opening $\theta t$ of the throttle, shift lever position Lp (R, N, 2nd, 1st), rotational speed No of the output shaft 14, and pressure P of fluid discharged by the pump 11a are read from the relevant sensors. At 601, it is discriminated whether or not the shift lever position Lp is neutral position N and if Lp is N, then at 602 the data at the neutral position N are read. If Lp is not N at 601, then at 603 it is discriminated whether the shift lever position Lp is a backward running position R or a first speed position 1st. If the answer is No; that is, when the shift lever position Lp is a second speed position 2nd, then at 604 information on the shift is retrieved from data No, $\theta t$ using a shift map showing shift patterns in FIGS. 10A and 10B. At 605, a shift position command obtained from the result of processing at 603 or 604 is compared with the current speed stage so as to discriminate whether the process should be proceeded either to shift-down zone or to shift-up zone. If at 605 there is no change in shift, then at 606 it is discriminated again whether the shift lever position Lp is 1st or R. If, as a result, Lp is neither R nor 1st and is 2nd, then the process is proceeded to STEP 612, and the result of previous processing or the initial value is outputted as it is. If at 606 Lp is either R or 1st, then the process is proceeded to the hydraulic drive control subroutine at 607 which will be mentioned later. If at 605 there is a shift change, the system proceeds to 608 where a clutch engaging pattern as shown in FIG. 11 is read. The clutch engaging pattern is as shown in an example of shift timing data in FIG. 12, and control electric currents Ica and Icb to be supplied from the control section 21 to the solenoids of the clutch pressure controlling valves 45 and 24, respectively, are varied so as to connect or disconnect the clutches 43 and 31. Further, changes in control electric currents Ica and Icb at (Tf, Tt, Tm, etc.) against speed stages when a shift change occurs are given by the matrix as shown in FIG. 11. At 609, it is determined whether or not the shift change is a change from 1st to 2nd. In case the shift change is a speed change from 1st to 2nd, then at 611, as shown by an example of shift timing data in FIG. 12C, electric current Ipd to be supplied from the control section 21 to the solenoid of the valve 15 for controlling the discharge of fluid from the pump 11a and electric current Ivf to be supplied from the control section 21 to the solenoid of the hydraulic valve 203 are varied against the change-over time t, and the resultant values are outputted at 612. If at 609 the shift change is not a change from 1st to 2nd, then the process is proceeded to 610, where the start timing of hydraulic drive routine is read. The start timing is as shown by an example of shift timing data in FIG. 12D, and electric current Ipd to be supplied from the control section 21 to the solenoid of the valve 15 for controlling the discharge of fluid from pump 11a, electric current Imd to be supplied from the control section 21 to the solenoid of the valve 16 for controlling the discharge of fluid from motor 13, and electric current Ivf to be supplied from the control section 21 to the solenoid of the hdyraulic valve 203 are caused to rise after the start timing Ths. The hydraulic drive control subroutine at STEP 600 which is outputted at 612 is as shown in a flowchart in FIG. 12. At step 700, a target number of revolutions Ne of the engine against the degree of opening $\theta t$ of the throttle obtained by depressing the accelerator pedal is calculated. (Refer to FIG. 13)

Figure 15:
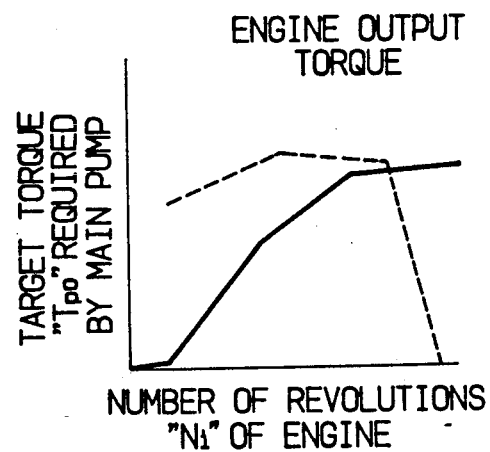
Figure 16:
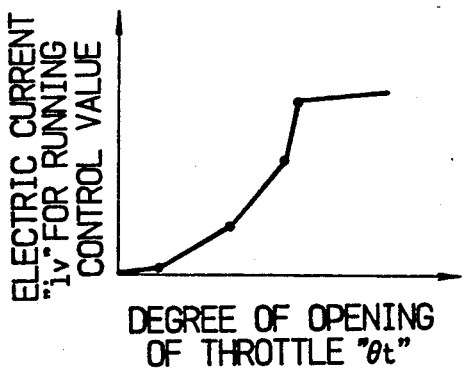
Figure 17:
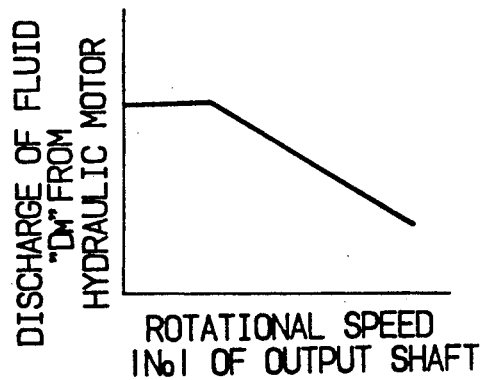
Figure 20A:
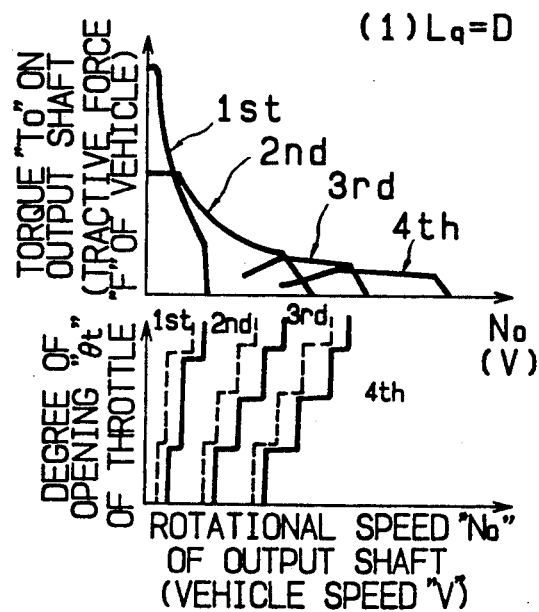
FIGS. 20A to 20D are graphs showing the relationship between the positions of the gear-shift lever and the rotational speed of the output shaft, the degree of opening of the throttle, the torque on the output shaft, and speed stages, respectively.
Figure 20B:
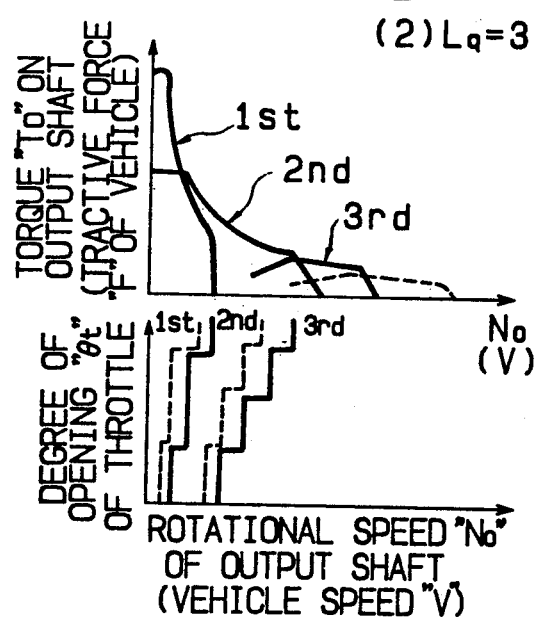
Figure 20C:
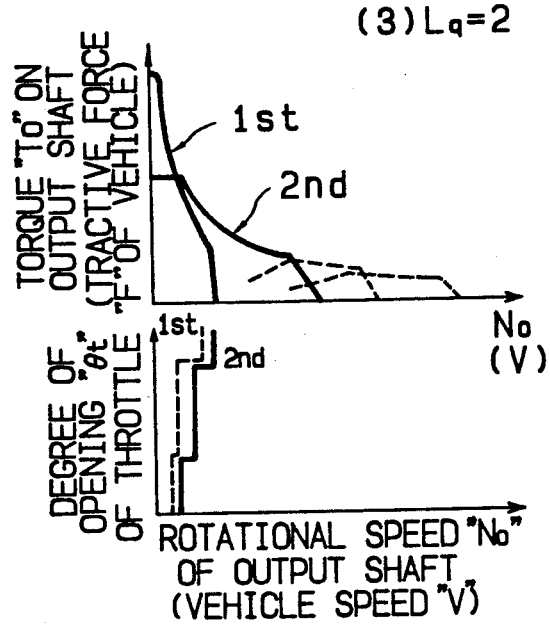
Figure 20D:
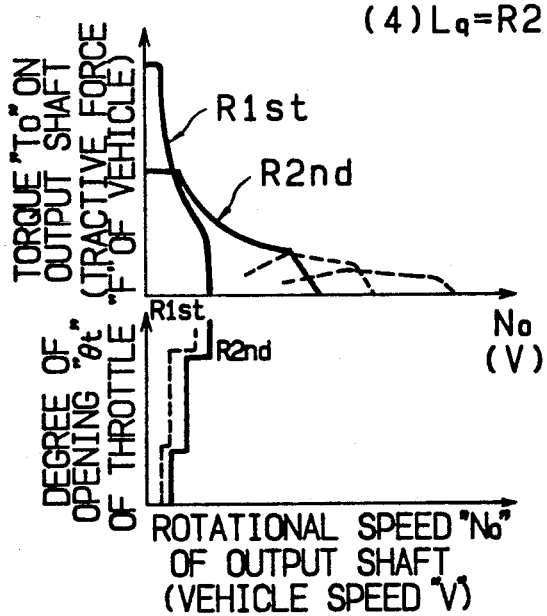

At step 701, deviation ei of the number of revolutions Ni of the shaft 2 from the target number of revolutions Ne of engine is calculated. At 702, the target torque Tpo required by the pump 11a against the degree of opening $\theta t$ of the throttle is calculated. (Refer to FIG. 15) At 703, the torque Tp required by the pump 11a when the deviation ei in the rotational speed is taken into account is calculated, and at step 704 the discharge Dp of fluid from pump 11a against the pressure P of fluid discharge by the pump when the required torque Tp is obtained. At step 705, control electric current Ipd commanded by the control section 21 to be supplied to the solenoid of the discharge controlling valve 15 so that the discharge Dp of fluid may be obtained in calculated. At step 706, control electric current Iv commanded by the control section 21 to be supplied to the solenoid of hydraulic valve 23 so as to obtain a flow rate of fluid matching the running speed of the vehicle against the degree of opening $\theta t$ of the throttle is calculated. (Refer to FIG. 16) At step 707, it is discriminated whether or not the shift lever position Lp is R. As a result, if Lp is not R, then at step 708, the control electric current Ivf for the forward running solenoid of the hydraulic valve 203 is given the control electric current Iv which is calculated at STEP 706, and the control electric current Ivr for the backward running solenoid of the hydraulic valve 203 is given zero. Further, if Lp is R, then at step 709, control current Ivr for the backward running solenoid is given control current Iv which is calculated at step 706, whilst the control current Ivf is given zero. At step 710, the discharge of fluid from the hydraulic motor 13 against the rotational speed No of the output shaft or the running speed of the vehicle is calculated. (Refer to FIG. 17) At step 711, the control current Imd for controlling the hydraulic motor which enables the discharge of fluid calculated at step 710 to be obtained is calculated.

Figure 18:
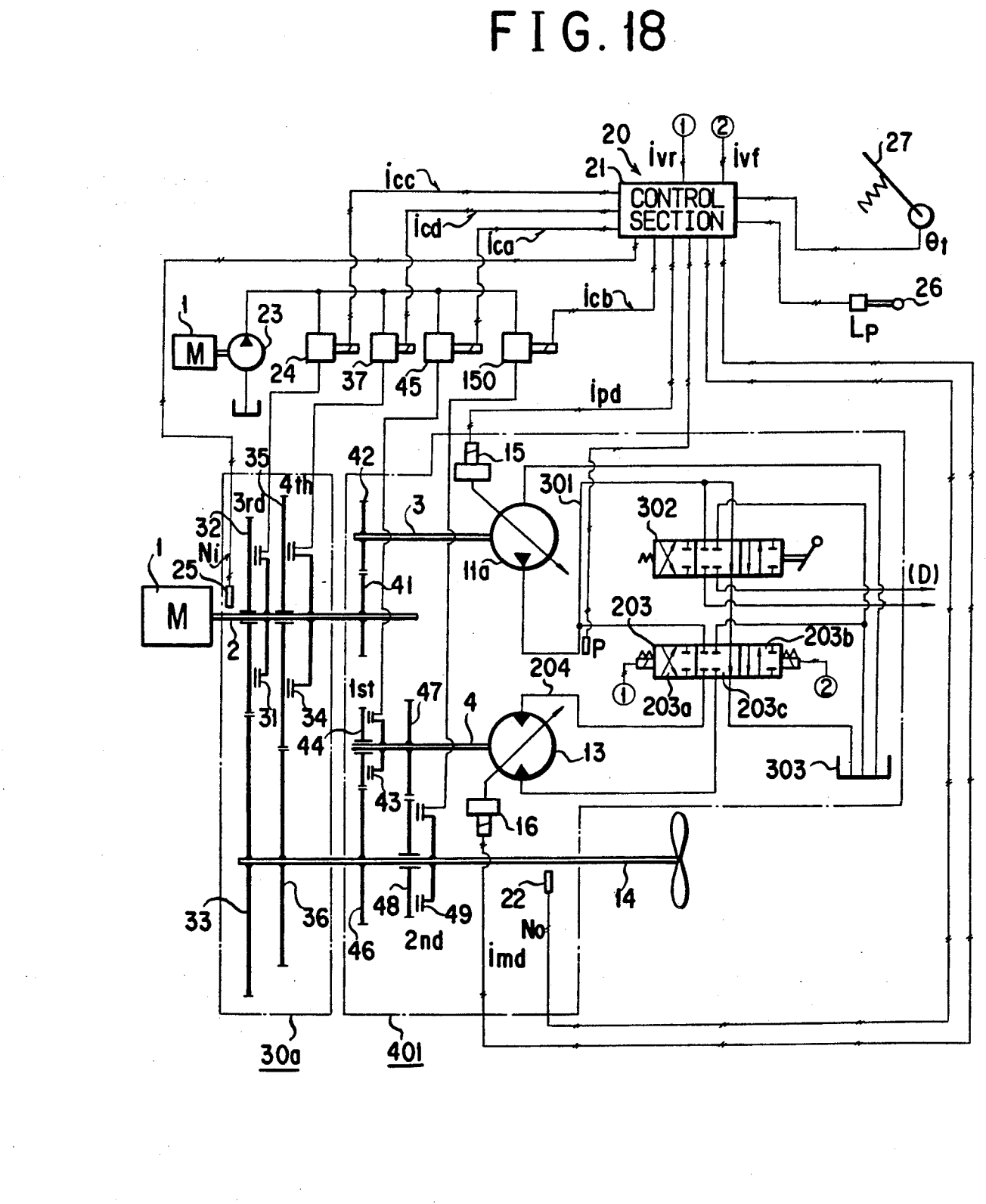

FIG. 18 shows the seventh embodiment. In the drawing, the same component parts thereof as those in the first and sixth embodiments are denoted with the same reference numerals and characters, and therefore the description thereof is omitted herein.

The first speed stage 1st is formed in the same construction as that of the sixth embodiment. The second speed stage 2nd comprises a gear 48 rotatably mounted on an output shaft 14 and which meshes with a gear 47 fixedly secured to a motor shaft 4, and a clutch 49 of a speed increasing and decreasing device 401 mounted on the output shaft 14. When the clutch 49 is supplied with fluid discharged by the pump 23 through a clutch pressure controlling valve 150 which is under control of the control section 21, the clutch 49 is connected so as to transmit the power transmitted to the motor shaft 4 to the output shaft 14. A mechanical transmission gear 30a comprises a third speed stage 3rd and a fourth speed stage 4th, which are formed in the same construction as the second speed stage 2nd of the sixth embodiment. The third speed stage 3rd comprises a clutch 31 fixedly secured to a shaft 2 of the mechanical transmission gear 30a, a gear 32 rotatably mounted on the shaft 2, and a gear 33 meshing with the gear 32 and fixedly secured to the output shaft 14. When the clutch 31 is supplied with fluid under pressure discharged by the pump 23 through a clutch pressure controlling valve 24 which is under control of the control section 21, the clutch 31 is connected so as to transmit the power developed by the prime mover 1 to the output shaft 14. The fourth speed stage 4th comprises likewise a clutch 34, a gear 35, a gear 36, and a clutch pressure controlling valve 37. Further, in this case, the clutches 31, 34 and the gears 32, 35 may be provided on the output shaft 14; and the gears 33, 36 may be provided on the shaft 2, or they may be provided alternately.

The operation of the seventh embodiment having the above-mentioned configuration will be described below with reference to a flowchart shown in FIG. 19. In the case of this embodiment, the shift lever position Lq includes R2 for backward running at second speed, R1 for backward running at first speed, N for neutral position, and 1, 2, 3 and D for forward running at first to fourth speeds, respectively. At step 804, information on gear shift is retrieved from data No and $\theta$t using a shift map showing shift patterns against shift lever position Lq in FIGS. 20A to 20D. At step 805, a shift position command obtained from the result of processing at 803 or 804 is compared with the current speed stage so as to discriminate whether the process is to be proceeded to a shift down zone or to a shift up zone. If at step 805 there is no shift change, then at step 806 it is discriminated whether the current speed stage is at hydraulic drive positions 1st, 2nd, R 1st, R 2nd. If the current speed stage is not at such positions, namely, it is at 3rd or 4th, then the process is proceeded to 813. If at step 806 the current speed stage is at either one of 1st, 2nd, R 1st, R 2nd, the process is proceeded to hydraulic drive control subroutine step 807, as in the case of the sixth embodiment. At that time, at STEP 607 in the sixth embodiment and also at STEP 807 in seventh embodiment, the discharge of fluid from the hydraulic motor against the rotational speed of the output shaft will change according to 1st, 2nd or R 1st, R 2nd, as shown in FIG. 21. At that time, as shown in FIG. 22, the rotational speed of the motor shaft 4 may be detected in place of the rotational speed of the output shaft. If at step 805 the occurrence of shift change is confirmed, then the process is proceeded to step 808 where the clutch engaging pattern (Refer to FIG. 23) is read. The clutch engaging pattern is as shown in an example of shift timing data in FIG. 12A, and either one of control currents Ica, Icb, Icc or Icd to be supplied from the control section 21 to the solenoids of the clutch pressure controlling valves 45, 150, 24 and 37 is varied so as to connect or disconnect one of the clutches 43, 49, 31 or 34. Further, changes in the control currents Ica, Icb, Icc aand Icd at (Tf, Tt, Tm, etc.) against the speed stages when a shift change occurs are made according to the matrix as shown in FIG. 23. At step 809, it is determined whether the shift change is a change-over from hydraulic drive to direct connection of the mechanical transmission gear 40a. As a result, if it is a change-over from hydraulic drive to direct connection, then at step 810, as shown by an example of shift timing data in FIG. 12C, electric current Ipd to be supplied by the control section 21 to the solenoid of the valve 15 for controlling the discharge of fluid from the pump 11a and electric current Ivf to be supplied by the control section 21 to the solenoid of the hydraulic valve 203 are varied against the change-over time t, and signals indicative of varied electric currents are outputted at step 813. In case the shift change is not a change-over from hydraulic drive mode to mechanical transmission mode, then the process is proceeded to step 811 where it is determined whether the shift change is a change-over from the mechanical transmission mode to the hydraulic drive mode. If not, the process is proceeded to step 813, and the result of discrimination is outputted as it is. In case the shift change is a change-over from hydraulic drive to direct connection of the mechanical transmission gear 30a, then at step 812, as shown by an example of shift timing data in FIG. 12D and as in the case of the sixth embodiment, the electric current Ipd to be supplied by the control section 21 to the solenoid of the valve 15 for controlling the discharge of fluid from the pump 11a, and the electric current Ivf to be supplied by the control section 21 to the solenoid of the hydraulic valve 203 are varied against the change-over time t, and signals indicative of varied electric currents are outputted at 813.

Further, the above-mentioned sixth embodiment has one speed stage for hydraulic drive mode and one speed stage for mechanical drive mode, and the seventh embodiment has two speed stages for hydraulic drive mode and two speed stages for mechanical drive mode. Combinations as shown in FIG. 24 may also be used. Moreover, while in the above-mentioned embodiments, one or two pieces of hydraulic valves are provided between the pump and the motor, a multiplicity of hydraulic valves may be provided therebetween, and also, tandem, series, parallel circuits or composite circuits may be used as hydraulic circuits. Further, in the above-mentioned embodiments, the hydraulic circuits for the hydraulic transmission gear have been described of open circuits only, however, it is needless to say that closed circuits may be used as well.

I claim:

1. A method for controlling power transmission using a mechanical-hydraulic transmission gear system including a prime mover having a speed control means; a hydraulic transmission gear operatively connectable to said prime mover and having a variable displacement hydraulic pump and a variable displacement hydraulic motor; a control unit; and a mechanical transmission gear having a clutch and being operatively connectable to said prime mover, said control unit being in communication with at least said clutch, wherein when the rotational speed of an output shaft is lower than a predetermined value, the method includes the steps of disconnecting said clutch of the mechanical transmission gear fixedly secured to an input shaft and transmitting the power from the prime mover through the hydraulic transmission gear to the output shaft according to a signal transmitted by said control unit;

wherein when the rotational speed of the output shaft is higher than the predetermined value, the method includes the steps of connecting the clutch of said mechanical transmission gear to thereby transmit the power from the prime mover through the mechanical transmission gear to the output shaft according to a signal from said control unit, and minimizing the power required by the hydraulic transmission gear according to a command from said control unit.

2. A method of controlling power transmission using a mechanical-hydraulic transmission gear system according to claim 1, characterized in that to minimize the power required by said hydraulic transmission gear the discharge of fluid from said hydraulic pump and that from said hydraulic motor are reduced to zero by actuating displacement control devices of said pump and said motor according to a command from said control unit.

3. A method of controlling power transmission using a mechanical-hydraulic transmission gear system including a prime mover having a speed control means; a hydraulic transmission gear, having a clutch, being operatively connectable to said prime mover, and having a variable displacement hydraulic pump and a variable displacement hydraulic motor; a control unit; and a mechanical transmission gear having a clutch and being operatively connectable to said prime mover, said control unit being in communication with at least said clutches, wherein when the rotational speed of an output shaft is lower than a predetermined value, the method includes the steps of disconnecting said clutch of the mechanical transmission gear fixedly secured to an input shaft and connecting said clutch of the hydraulic transmission gear to thereby transmit the power from the prime mover through the hydraulic transmission gear to the output shaft according to a signal transmitted by said control unit;

wherein when the rotational speed of the output shaft is higher than the predetermined value, the method includes the steps of connecting the clutch of said mechanical transmission gear and disconnecting the clutch of the hydraulic transmission gear to thereby transmit the power from the prime mover through the mechanical transmission gear to the output shaft according to a signal transmitted by said control unit, and minimizing the power required by the hydraulic transmission gear according to a command from said control unit.

4. A method of controlling power transmission using a mechanical-hydraulic transmission gear system according to claim 3, characterized in that to minimize the power required by the hydraulic transmission gear the discharge of fluid from said hydraulic pump and that from said hydraulic motor are reduced to zero by actuating displacement control devices of said pump and said motor according to a command from said control unit.

5. A method of controlling power transmission using a mechanical-hydraulic transmission gear system according to claim 3, characterized in that to minimize the power required by said hydraulic transmission gear the rotation of at least one of said hydraulic pump and said hydraulic motor is stopped by means of the clutch thereof according to a command from said control unit.

6. A method of controlling power transmission using a mechanical-hydraulic transmission gear system including a prime mover having a speed control means; a hydraulic transmission gear operatively connectable to said prime mover, having a clutch and having a variable displacement hydraulic pump and a variable displacement hydraulic motor with a hydraulic valve therebetween; a control unit; and a mechanical transmission gear having a clutch and being operatively connectable to said prime mover, said control unit being in communication with at least said clutches, wherein when the rotational speed of an output shaft is lower than a predetermined value, the method includes the steps of disconnecting said clutch of the mechanical transmission gear fixedly secured to an input shaft and also connecting said clutch of the hydraulic transmission gear to thereby transmit the power from the prime mover through the hydraulic transmission gear to the output shaft according to a signal transmitted by said control unit, and changing over the rotational direction of the output shaft by actuating said hydraulic valve provided in a fluid passage connected between said pump and said motor and adapted to be changed over according to a signal transmitted by said control system;

wherein when the rotational speed of the output shaft is higher than the predetermined value, the method includes the steps of connecting the clutch of said mechanical transmission gear and disconnecting the clutch of the hydraulic transmission gear to thereby transmit the power from the prime mover through the mechanical transmission gear to the output shaft according to a signal transmitted by said control unit, and minimizing the power required by said hydraulic transmission gear according to a command from said control unit.

7. A method of controlling power transmission using a mechanical-hydraulic transmission gear system according to claim 6, characterized in that when said hydraulic valve is located at its neutral position and vicinity the fluid under pressure to be supplied to said hydraulic pump can be supplied to another fluid circuit.

8. A method of controlling power transmission using a mechanical-hydraulic transmission gear system according to claim 6, characterized in that irrespective of whether or not said hydraulic valve is operated the fluid under pressure to be supplied to said hydraulic pump can be supplied to another fluid circuit by operating another manual fluid pressure change-over valve provided in a fluid passage connected between said pump and said motor.

9. A method of controlling power transmission using a mechanical-hydraulic transmission gear system including a prime mover having a speed control means; a hydraulic transmission gear operatively connectable to said prime mover and having a variable displacement hydraulic pump and a variable displacement hydraulic motor; a control unit; a mechanical transmission gear having a clutch and being operatively connectable to said prime mover, said control unit being in communication with at least said clutch; and a speed multiplying/reducing gear set operatively connectable to said hydraulic transmission gear and said mechanical transmission gear, wherein when the rotational speed of an output shaft is lower than a predetermined value, the method includes the steps of disconnecting said clutch of the mechanical transmission gear fixedly secured to an input shaft and transmitting the power from the prime mover through said hydraulic transmission gear and said speed multiplying/reducing gear set to the output shaft according to a signal transmitted by said control unit;

wherein when the rotational speed of the output shaft is higher than the predetermined value, the method includes the steps of connecting the clutch of said mechanical transmission gear to thereby transmit the power from the prime mover through the mechanical transmission gear and said speed multiplying/reducing gear set to the output shaft according to a signal transmitted by said control unit, and minimizing the power required by said hydraulic transmission gear according to a command from said control unit.

10. A method of controlling power transmission using a mechanical-hydraulic transmission gear system according to claim 9, characterized in that to minimize the power required by said hydraulic transmission gear the discharge of fluid from said hydraulic pump and that from said hydraulic motor are reduced to zero by actuating displacement control devices of said pump and said motor according to a command from said control unit.

11. A method of controlling power transmission using a mechanical-hydraulic transmission gear system including a prime mover having a speed control means; a hydraulic transmission gear operatively connectable to said prime mover, having a clutch, and having a variable displacement hydraulic pump and a variable displacement hydraulic motor with a hydraulic valve therebetween; a control unit; a mechanical transmission gear having a clutch and being operatively connectable to said prime mover, said control unit being in communication with at least said clutches; and a speed multiplying/reducing gear set, wherein when the rotational speed of an output shaft is lower than a predetermined value, the method includes the steps of disconnecting a clutch of the mechanical transmission gear fixedly connected to an input shaft and also connecting a clutch of the hydraulic transmission gear to thereby transmit the power from the prime mover through the hydraulic transmission gear to the output shaft according to a signal transmitted by said control unit, and changing over the rotational direction of the output shaft by actuating a hydraulic valve provided in a fluid passage connected between said hydraulic pump and said hydraulic motor and adapted to be changed over according to a signal transmitted by said control unit;

wherein when the rotational speed of the output shaft is higher than the predetermined value, the method includes the steps of connecting the clutch of said mechanical transmission gear and also disconnecting the clutch of said hydraulic transmission gear to thereby transmit the power from the prime mover through the mechanical transmission gear to the output shaft according to a command from said control unit, and minimizing the power required by said hydraulic transmission gear according to a command from said control unit.

12. A method of controlling power transmission using a mechanical-hydraulic transmission gear system according to claim 11, characterized in that to minimize the power required by said hydraulic transmission gear the discharge of fluid from said hydraulic pump and that from said hydraulic motor are reduced to zero by actuating displacement control devices of said pump and said motor according to a command from said control unit.

13. A method of controlling power transmission using a mechanical-hydraulic transmission gear system according to claim 11, characterized in that to minimize the power required by said hydraulic transmission gear the rotation of at least one of said hydraulic pump and said hydraulic motor is stopped by means of the clutch thereof according to a command from said control unit.

14. A method of controlling power transmission using a mechanical-hydraulic transmission gear system according to claim 11, characterized in that when said hydraulic valve is located at its neutral position and vicinity the fluid under pressure to be supplied to said hydraulic pump can be supplied to another fluid circuit.

15. A method of controlling power transmission using a mechanical-hydraulic transmission gear system according to claim 11, characterized in that irrespective of whether or not said hydraulic valve is operated the fluid under pressure to be supplied to said hydraulic pump can be supplied to another fluid circuit by operating another manual fluid pressure change-over valve provided in a fluid passage connected between said hydraulic pump and said hydraulic motor.

16. A method of controlling power transmission using a mechanical-hydraulic transmission gear system according to claim 11, characterized in that at the step of changing over the rotational direction of the output shaft by actuating said hydraulic valve the rotational speed of the output shaft is controlled at the same time.

17. A mechanical-hydraulic transmission gear system for use in a construction vehicle including a prime mover having a speed control means; a hydraulic transmission gear operatively connectable to said prime mover and having a variable displacement hydraulic pump and a variable displacement hydraulic motor; a control unit; and a mechanical transmission gear having a clutch and being operatively connectable to said prime mover, said control unit in communication with at least said clutch and comprising a control means, the gear system further comprising a change-over means for changing forward running of the vehicle over to reversing and vice versa; a speed control means for controlling the running speed of the vehicle; and a sensor means for sensing the rotational speed of an output shaft;

wherein said control means is in communication with and is for comparing the signals transmitted by said change-over means, said speed control means and said sensor means for said output shaft so as to effect control of connection and disconnection of the clutch mounted on an input shaft of the mechanical transmission gear and effect control of increase and decrease of the displacement of each of said pump and said motor.

18. A mechanical-hydraulic transmission gear system for use in a construction vehicle including a prime mover having a speed control means; a hydraulic transmission gear operatively connectable to said prime mover and having a variable displacement hydraulic pump and a variable displacement hydraulic motor with a hydraulic valve therebetween; a control unit; and a mechanical transmission gear having a clutch and being operatively connectable to said prime mover, said control unit in communication with at least said clutch and comprising a control means, the gear system further comprising a change-over means for changing forward running of the vehicle over to reversing and vice versa; said hydraulic valve provided in a fluid passage connected between said pump and said motor and adapted to change over the rotational direction of an output shaft and also change over the flow of fluid under pressure so as to flow into another fluid circuit according to a signal transmitted by said change-over means; a speed control means for controlling the running speed of the vehicle; and a sensor means for sensing the rotational speed of an output shaft;

wherein said control means is in communication with and is for comparing the signals transmitted by said change-over means, said speed control means and said sensor means for said output shaft so as to effect control of connection and disconnection of the clutch mounted on an input shaft of the mechanical transmission gear and effect control of increase and decrease of the displacement of each of said pump and said motor.

19. A mechanical-hydraulic transmission gear system for use in a construction vehicle including a prime mover having a speed control means; a hydraulic transmission gear operatively connectable to said prime mover, having a clutch, and having a variable displacement hydraulic pump and a variable displacement hydraulic motor; a control unit; and a mechanical transmission gear operatively connectable to said prime mover and having a clutch, said control unit in communication with at least said clutches and comprising a control means, the gear system further comprising a change-over means for changing forward running of the vehicle over to reversing and vice-versa; a speed control means for controlling the running speed of the vehicle; and a sensor means for sensing the rotational speed of an output shaft;

wherein said control means is in communication with and is for comparing the signals transmitted by said change-over means, said speed control means and said sensor means for said output shaft so as to effect control of connection and disconnection of the clutches of the mechanical transmission gear and the hydraulic transmission gear and effect control of increase and decrease of the displacement of each of said pump and said motor.

20. A mechanical-hydraulic transmission gear system for use in a construction vehicle including a prime mover having a speed control means; a hydraulic transmission gear operatively connectable to said prime mover, having a clutch, and having a variable displacement hydraulic pump and a variable displacement hydraulic motor with a hydraulic valve therebetween; a control unit; and a mechanical transmission gear having a clutch and being operatively connectable to said prime mover, said control unit in communication with at least said clutch and comprising a control means, the gear system further comprising a change-over means for changing forward running of the vehicle over to reversing and vice versa; said hydraulic valve provided in a fluid passage connected between said pump and said motor and adapted to change over the rotational direction of an output shaft and change over the flow of fluid under pressure so as to supply it to another fluid circuit according to a signal transmitted by said change-over means; a speed control means for controlling the running speed of the vehicle; and a sensor means for sensing the rotational speed of the output shaft;

wherein said control means is in communication with and is for comparing the signals transmitted by said change-over means, said speed control means and said sensor means for said output shaft so as to effect control of connection and disconnection of the clutches of the mechanical transmission gear and the hydraulic transmission gear and effect control of increase and decrease of the displacement of each of said pump and said motor.

21. A mechanical-hydraulic transmission gear system for use in a construction vehicle including a prime mover having a speed control means; a hydraulic transmission gear operatively connectable to said prime mover, having a clutch, and having a variable displacement hydraulic pump and a variable displacement hydraulic motor; a control unit; and a mechanical transmission gear having a clutch and being operatively connectable to said prime mover, said control unit in communication with at least said clutches and comprising control means, the gear system further comprising a change-over means for changing forward running of the vehicle over to reversing and vice versa; a speed control means for controlling the running speed of the vehicle; and a sensor means for sensing the rotational speed of an output shaft;

wherein said control means is in communication with and is for comparing the signals transmitted by said change-over means, said speed control means and said sensor means for said output shaft so as to effect control of connection and disconnection of the clutches of the mechanical transmission gear and the hydraulic transmission gear and effect control of increase and decrease of the displacement of at least one of said pump and said motor.

22. A mechanical-hydraulic transmission gear system for use in a construction vehicle including a prime mover having a speed control means; a hydraulic transmission gear operatively connectable to said prime mover and having a variable displacement hydraulic pump and a variable displacement hydraulic motor with first and second hydraulic valves therebetween; a control unit; and a mechanical transmission gear having a clutch and being operatively connectable to said prime mover, said control unit in communication with at least said clutches and comprising a control means, the gear system further comprising a change-over means for changing forward running of the vehicle over to reversing and vice versa; said first hydraulic valve provided in a fluid passage connected between said pump and said motor and adapted to change over the rotational direction of an output shaft and control the rotational speed of the output shaft according to a signal transmitted by said control unit; said second hydraulic valve provided in said fluid passage connected between said pump and said motor and adapted to change over the fluid under pressure to be supplied to the pump so as to flow into another fluid circuit; a speed control means for controlling the running speed of the vehicle; a sensor means for sensing the rotational speed of the output shaft;

wherein said control means is in communication with and is for comparing the signals transmitted by said change-over means, said speed control means and said sensor means for said output shaft for controlling disconnection and connection of the clutches of the mechanical transmission gear and the hydraulic transmission gear and for controlling the increase and decrease of the displacement of at least one of said pump and said motor.

* * * * *